United States Patent [19]

Rourke et al.

[11] Patent Number: 5,077,795
[45] Date of Patent: Dec. 31, 1991

[54] SECURITY SYSTEM FOR ELECTRONIC PRINTING SYSTEMS

[75] Inventors: John L. Rourke, Fairport; Peter D. Wing, Webster; Jack F. Ratcliffe, II, Pittsford; Paul J. Valliere, Fairport, all of N.Y.

[73] Assignee: Xerox Corporation, Stamford, Conn.

[21] Appl. No.: 591,330

[22] Filed: Sep. 28, 1990

[51] Int. Cl.$^5$ .................. G09C 5/00; G09C 3/00; G03G 21/00

[52] U.S. Cl. .................. 380/55; 235/382; 340/825.34; 355/201; 380/23; 380/51

[58] Field of Search ............ 380/3, 4, 23, 25, 51, 380/55; 355/201, 133; 235/380, 382, 382.5; 340/825.3, 825.31, 825.33, 825.34

[56] References Cited

U.S. PATENT DOCUMENTS

| | | |
|---|---|---|
| 4,498,132 | 2/1985 | Ahlstrom et al. .................. 364/200 |
| 4,525,780 | 6/1985 | Bratt et al. .................. 364/200 |
| 4,531,826 | 7/1985 | Stoughton et al. .................. 355/201 |
| 4,713,753 | 12/1987 | Boebert et al. .................. 364/200 |
| 4,728,984 | 3/1988 | Daniele .................. 355/6 |
| 4,739,377 | 4/1988 | Allen .................. 355/133 |
| 4,799,258 | 1/1989 | Davies .................. 380/21 |
| 4,827,508 | 5/1989 | Shear .................. 380/4 |

OTHER PUBLICATIONS

Xerox View Point, Quick Find Reference, Glossary-2 pgs., & pp. 2-3 to 2-11. (5/88).

Primary Examiner—Stephen C. Buczinski
Attorney, Agent, or Firm—Fredrick E. McMullen

[57] ABSTRACT

An electronic printing system with a security system for protecting the security of a user's files and programs through the intermediary of a user profile for each user administered to by a Security administrator at the site or from a remote site.

8 Claims, 28 Drawing Sheets

SECURITY SYSTEM FOR ELECTRONIC PRINTING SYSTEMS

The invention relates to electronic printers and printing systems, and more particularly, to a security system for electronic printers and printing systems.

In conventional light/lens copiers, document security has generally been grounded on physical possession of the document originals and the copies made while copier access and use has been based on billing considerations. In the case of document security, security for a user's originals and copies was attended to by the fact that the originals from which the copies were made as well as the copies themselves normally remained in the possession and control of the owner or in the hands of someone known to the owner and trusted to make copies. Control over copier access on the hand, if it existed at all, was generally based on assuring that the person using the copier and making copies was correctly billed or charged for the copies made. This for example led in the past to development and introduction of copy charge counters or meters which limited use of a copier to those persons having an account against which the cost of the copies could be charged. But generally, in the copier environment, little or no attention was given to security, and particularly to the security of the owner's files.

With the advent of electronic printing systems however, where the image is in the form of electrical signals or pixels, a user's electronic files, programs, etc., which may be confidential or personal in nature, are at least temporarily stored in the system. As a result, the owner's files may be available to anyone having access to the system for reading, copying, tampering, etc. A similar situation occurs with data that is transmitted to a communication channel to or from the system. Anyone having access to the system can intercept and gain access to the transmitted data for his own purposes.

In the prior art, security in the past has focused on computer systems as evidenced by U.S. Pat. No. 4,713,753 to Boebert el al wherein there is disclosed a secure system architecture for a data processor in which a predefined security policy, stored in a secure processor, uses format control to prevent alteration of a program. U.S. Pat. Nos. 4,525,780 to Bratt et al and 4,498,132 to Ahlstrom et al (which relies on U.S. Pat. No. 4,525,780 for its description) disclose a data processing system having an addressing system for processing object based information with a protection scheme for controlling access rights to the information. And U.S. Pat. No. 4,799,258 to Davies discloses a dual key system for controlling access to computers to assure a tamper resistant store.

Further in computer applications, a User Identification Code (UIC) technique has been used to control file access. In this technique, two numbers are provided per user, a group number and a member number. Each user accordingly is represented as a member of a group which may span a number of other users with a common need to share information. Further, each file has certain attributes associated with it, such as the UIC of the owner and the protection settings controlling READ and WRITE access. The UIC system however is limited in the levels of security that it can provide and has limited extensibility.

A second prior art technique of the type discussed in U.S. Pat. Nos. 4,498,132 and 4,525,780 above is based upon access lists where each operation on a file is controlled by a list maintained by the file's owner of users who are granted or denied access. The list additionally may contain pre-defined group names and object enablements or restrictions. The disadvantages of this technique are the large amount of memory required and large amounts of processing overhead needed to maintain and verify the list.

In contrast, the present invention provides a security process for an electronic reprographic printer, comprising the steps of: providing a security administrator; providing a security profile with discrete security levels for different classes of users under the control of the security administrator; giving the administrator power to assign user identification numbers at less secured sites, and enable use of passwords by the users at more secure sites; providing a site administrator; giving the site administrator control over user job programming options for the printer; isolating functions of the site administrator from user functions by assigning special identification number and password to the site administrator to prevent users from accessing the site administrator functions; and providing user file security by enabling users, to protect user files by user passwords, to limit access to others to user files, and to assign a non-removable security label to a user's files which prevent printing or displaying of the files without the security label.

IN THE DRAWINGS

Figure 1:
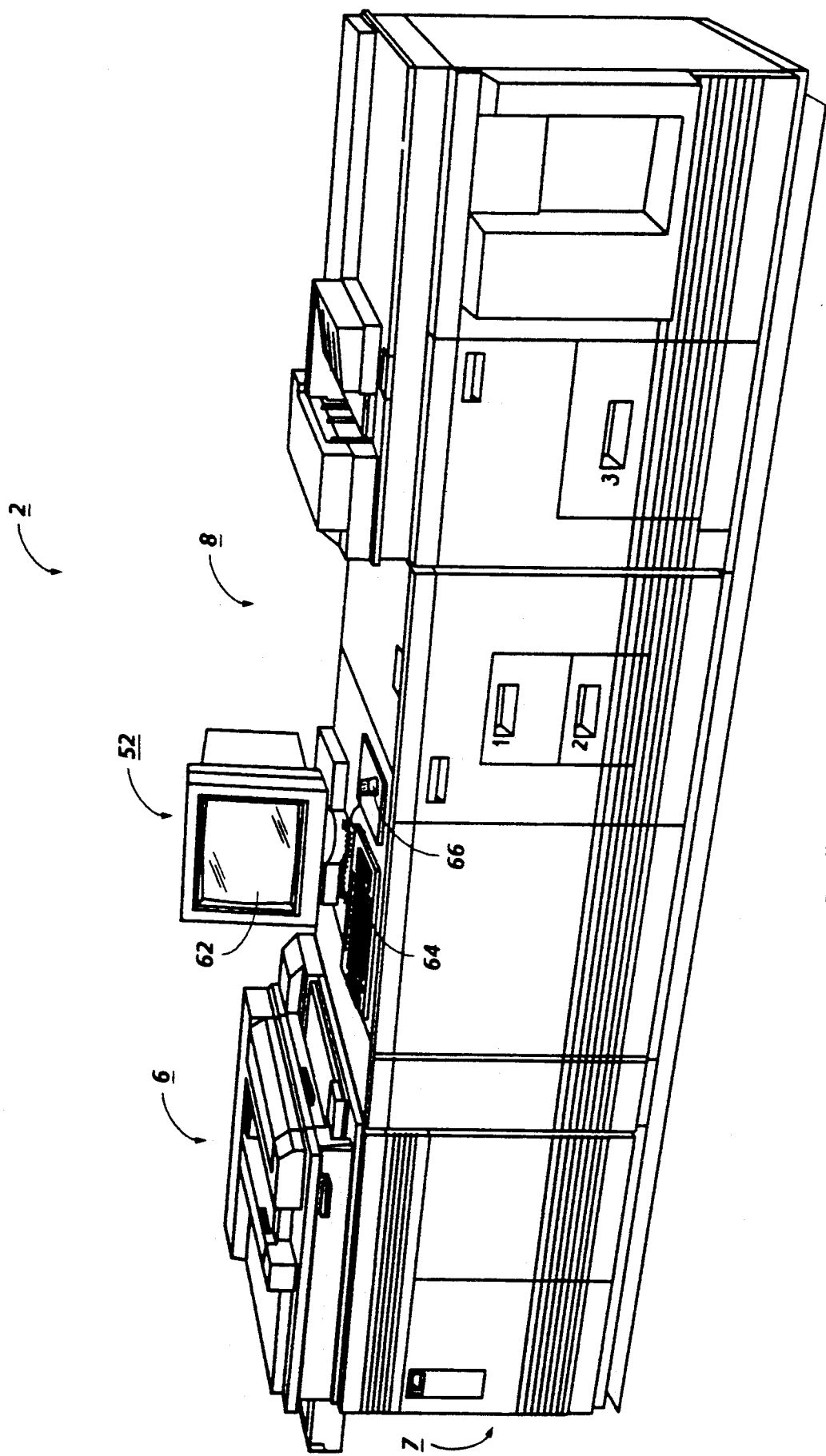
FIG. 1 is a view depicting an electronic printing system incorporating the security system of the present invention.
Figure 5A:
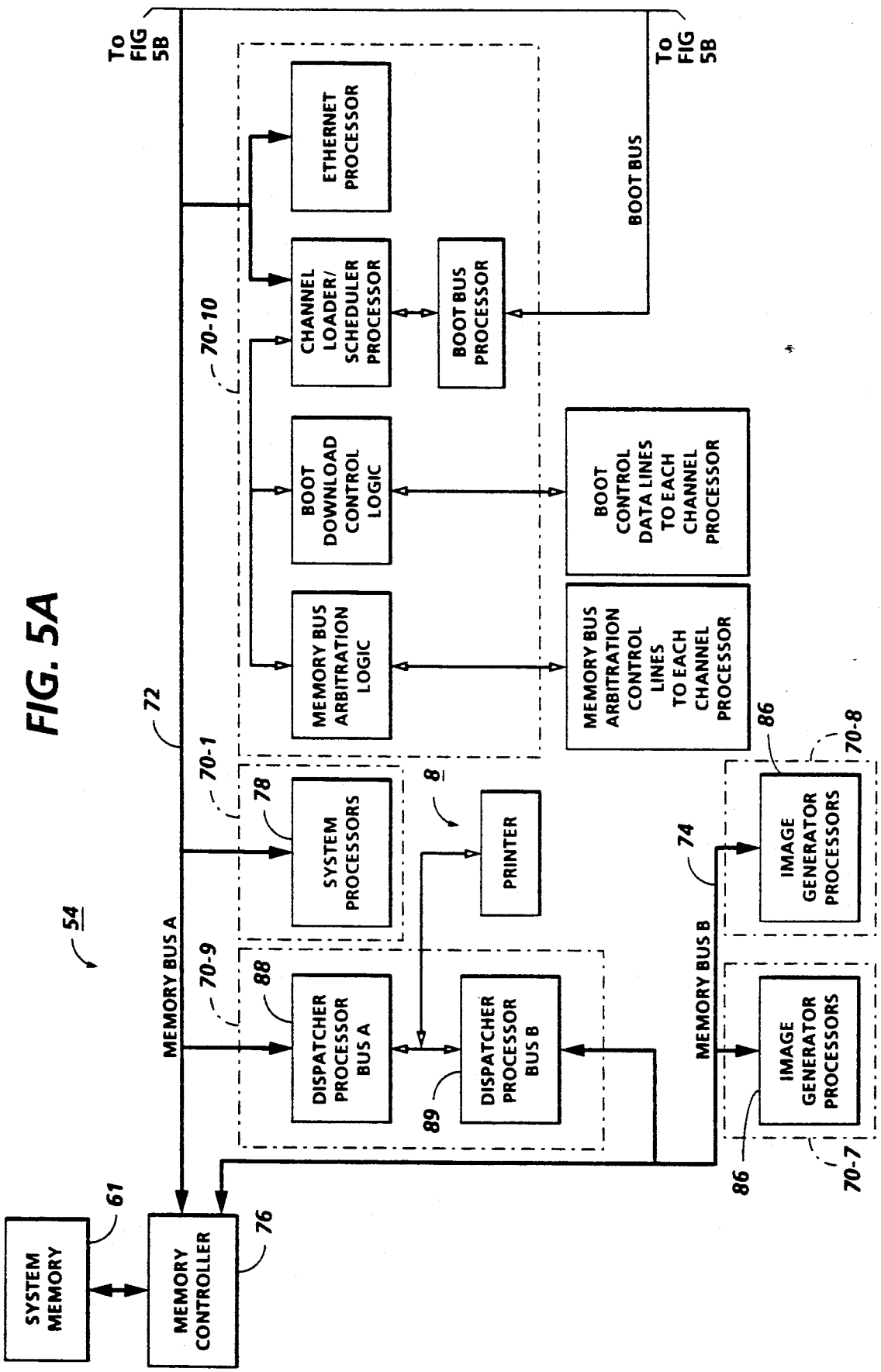
Figure 5B:
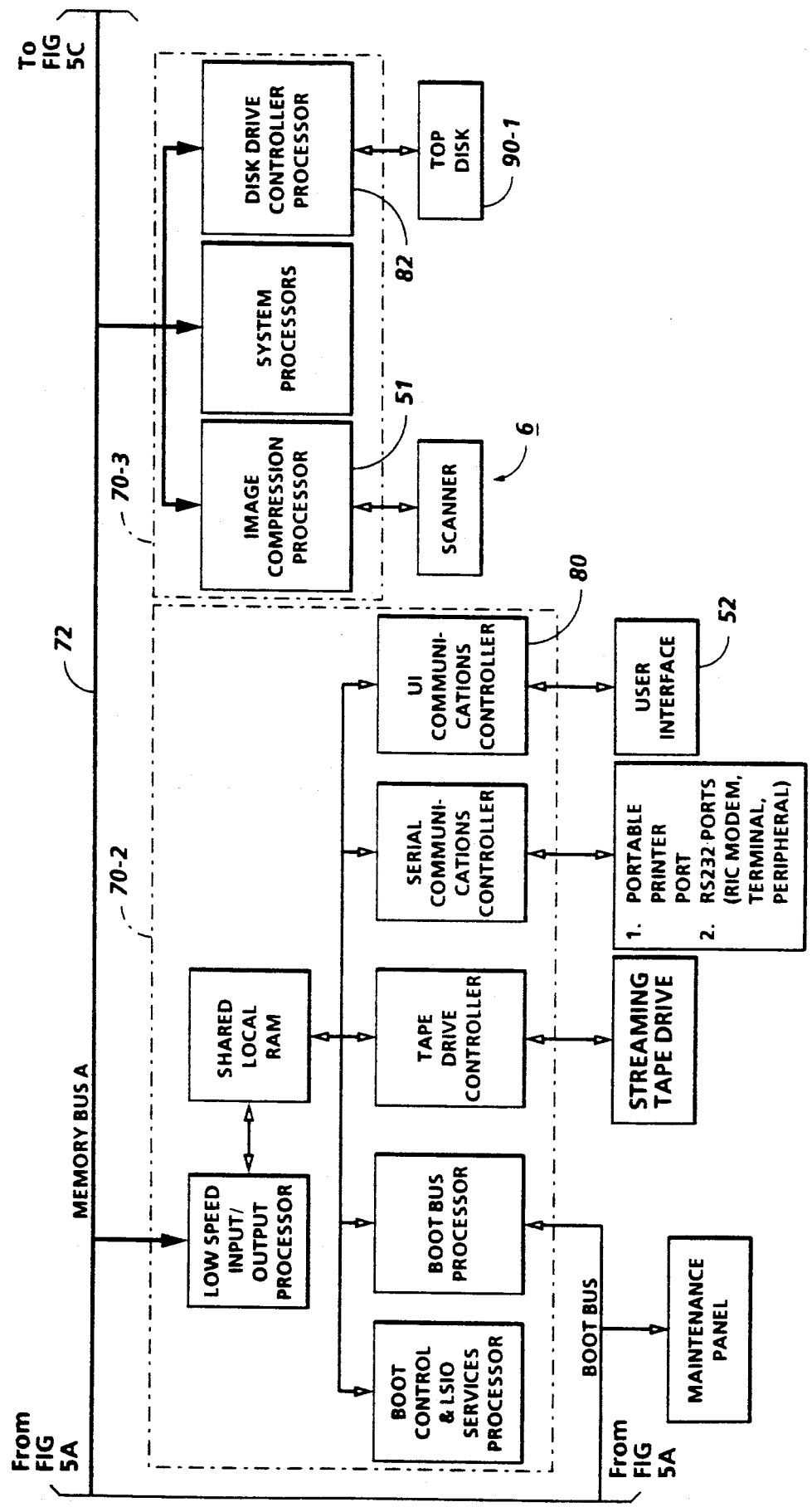
Figure 5C:
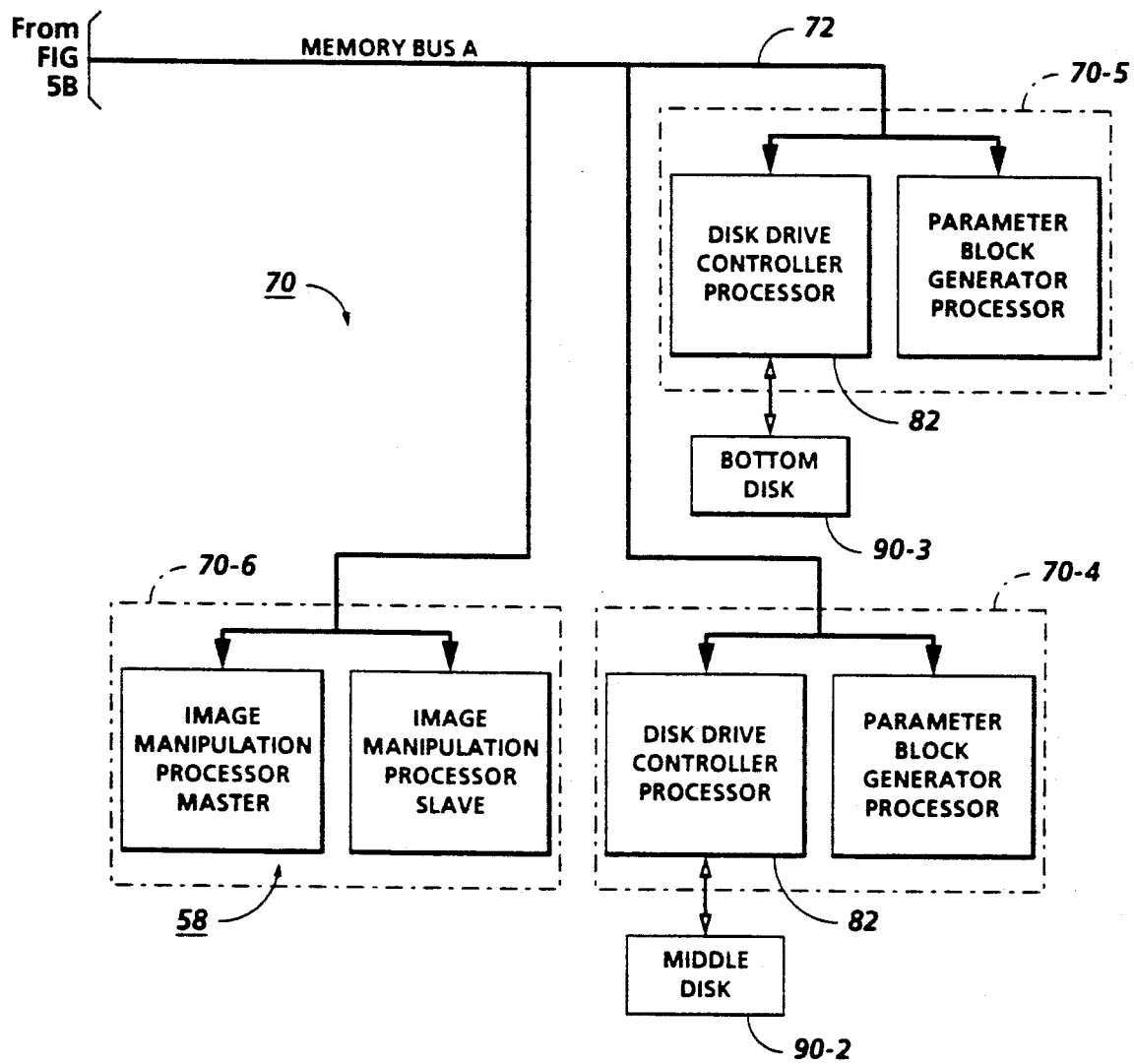
Figure 6:
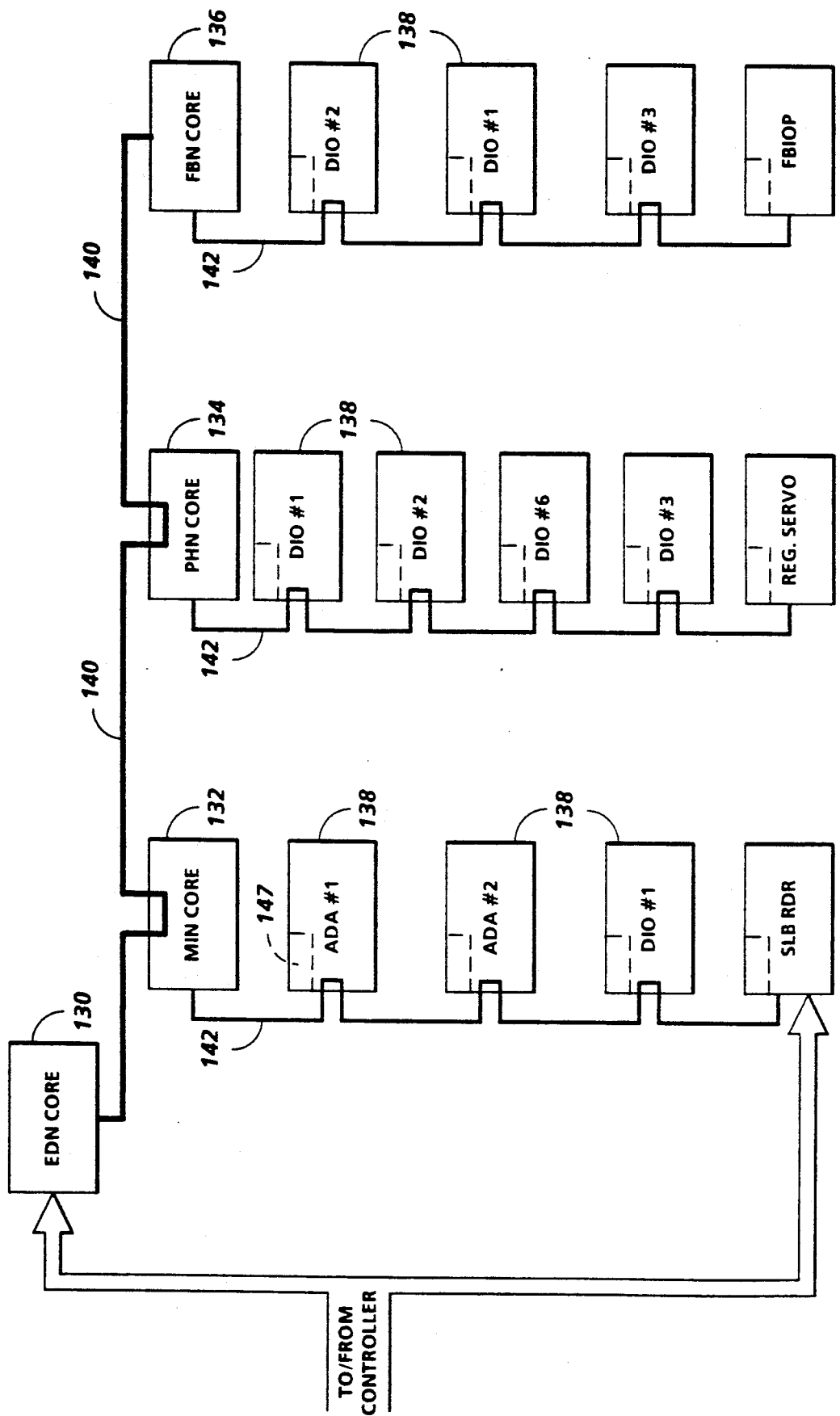
Figure 8:
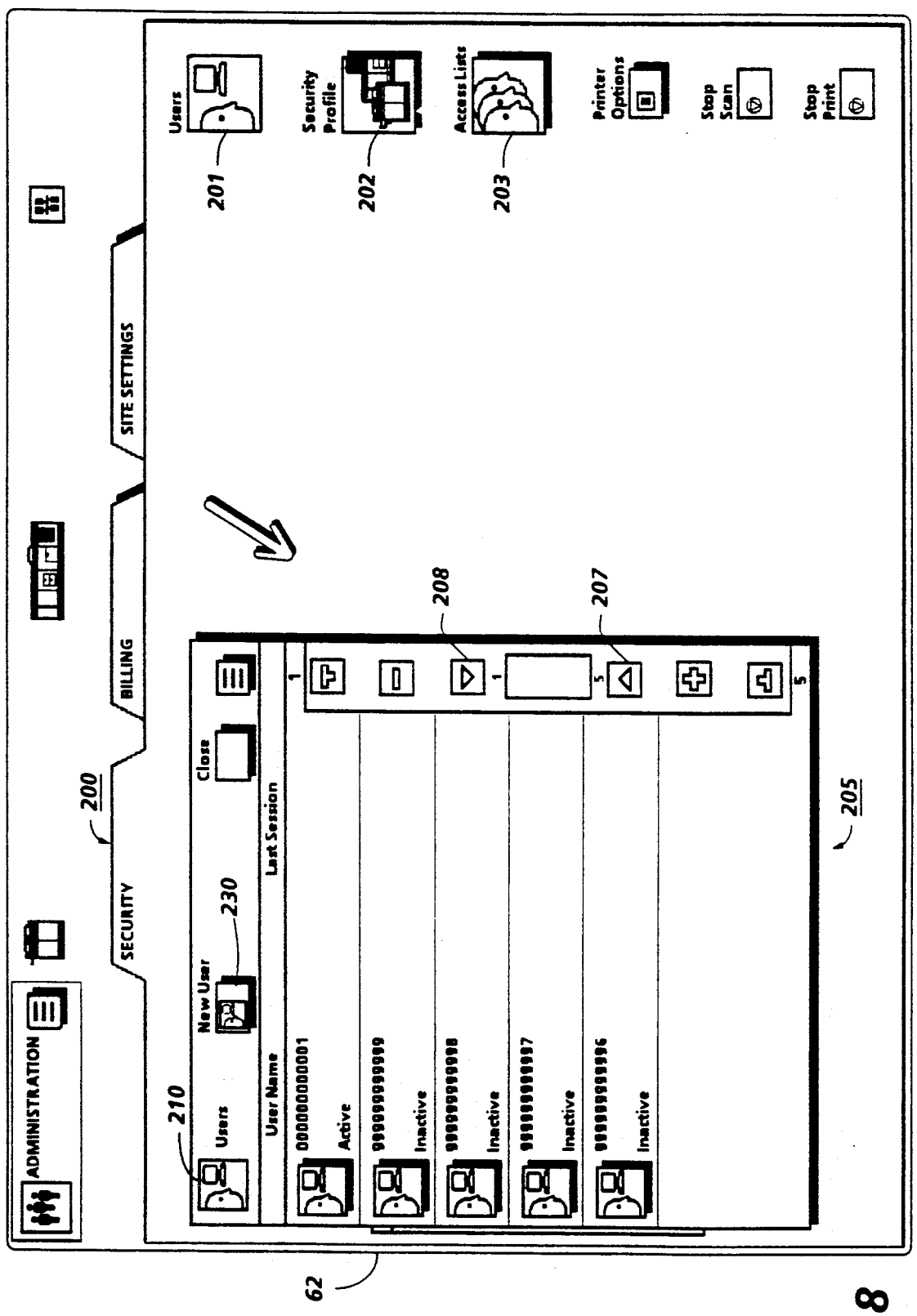
Figure 9:
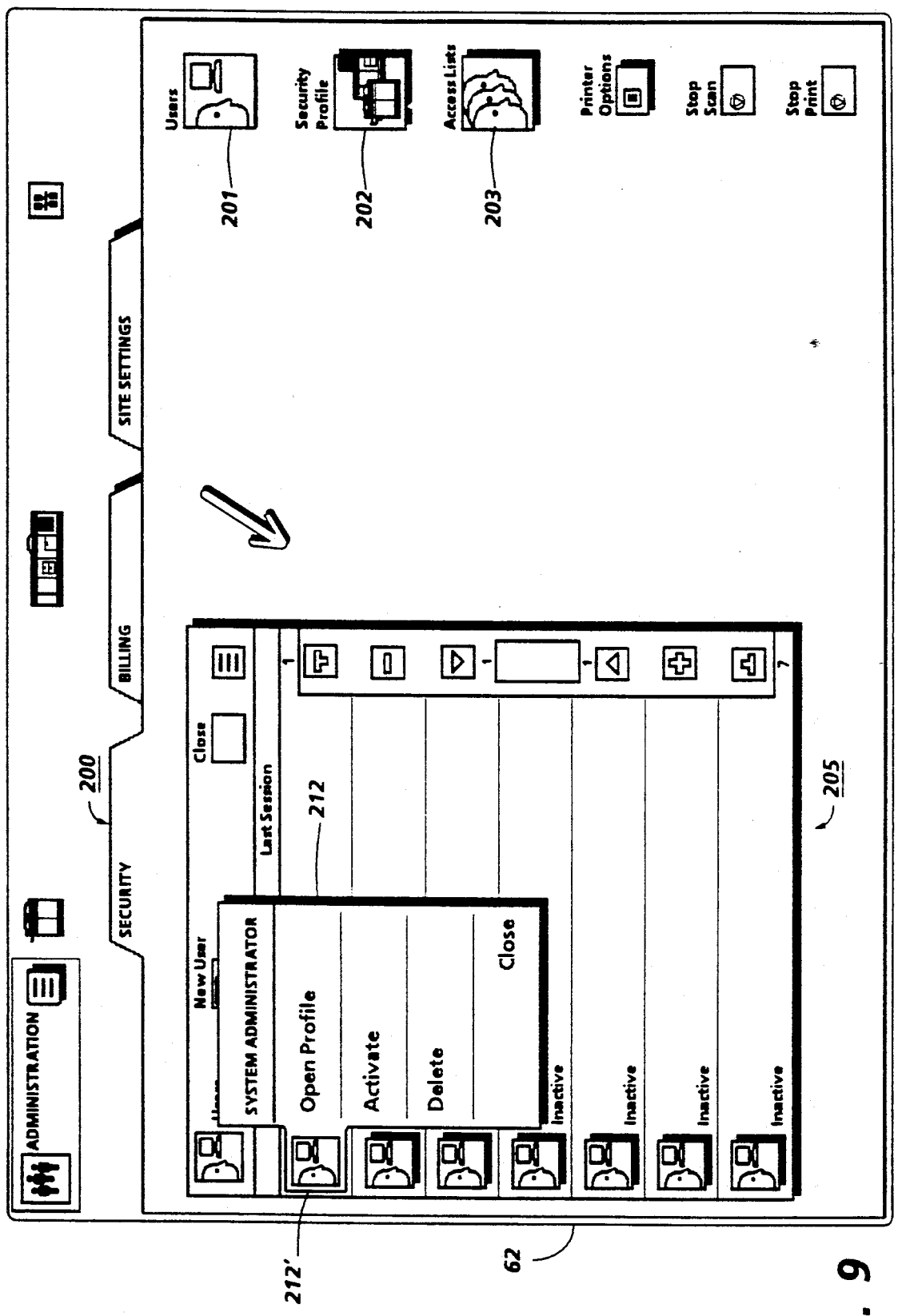
Figure 10:
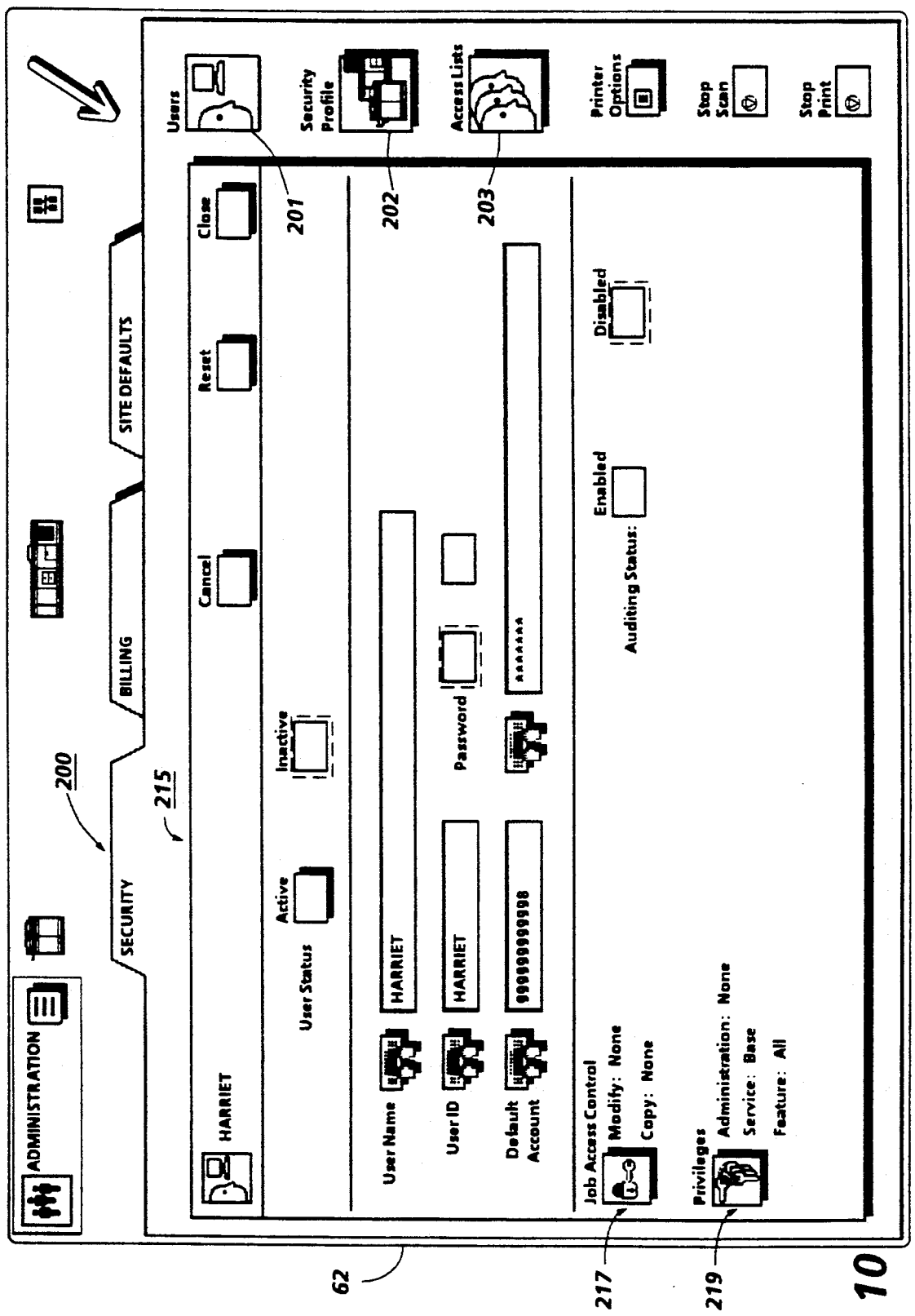
Figure 11:
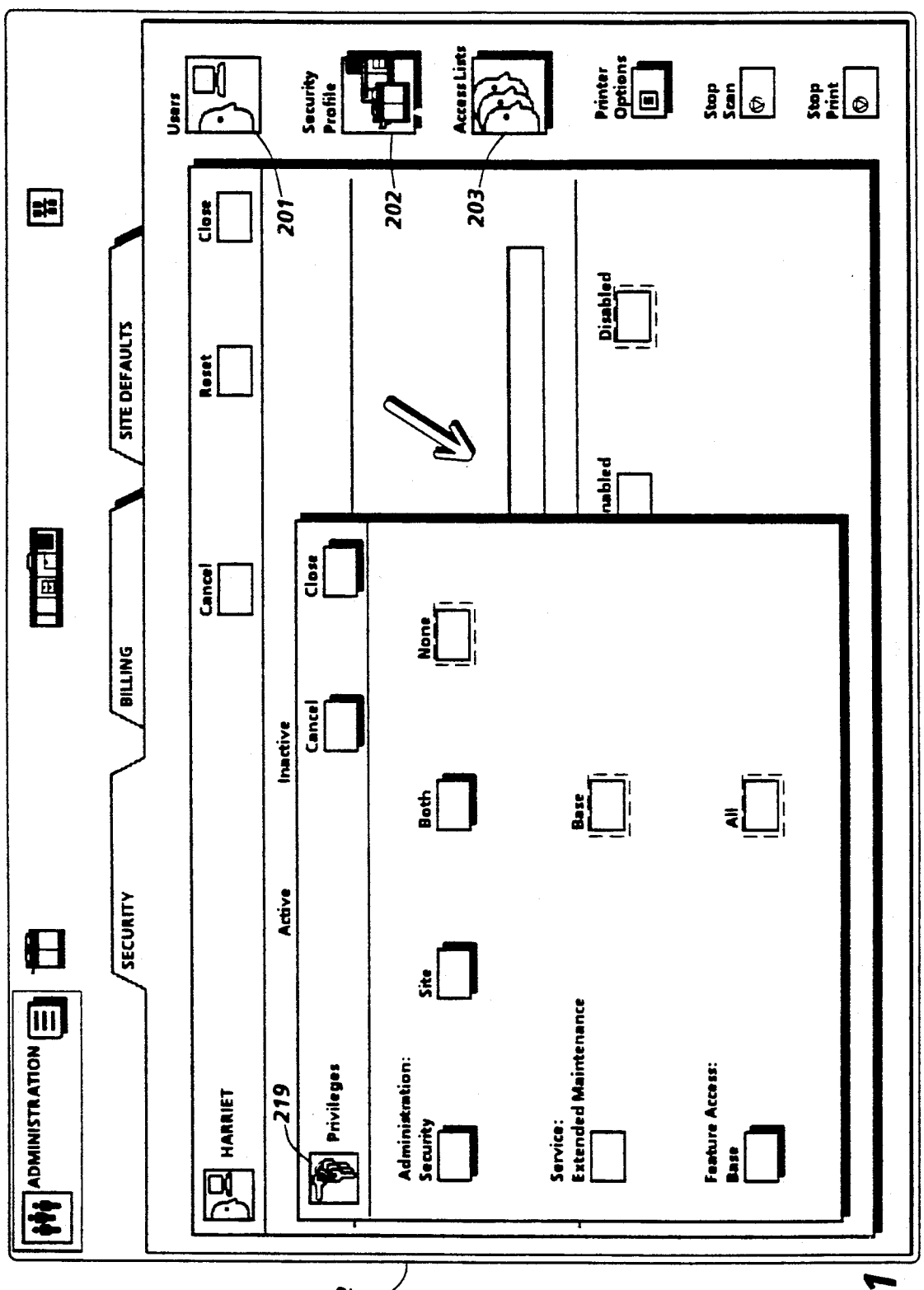
Figure 12:
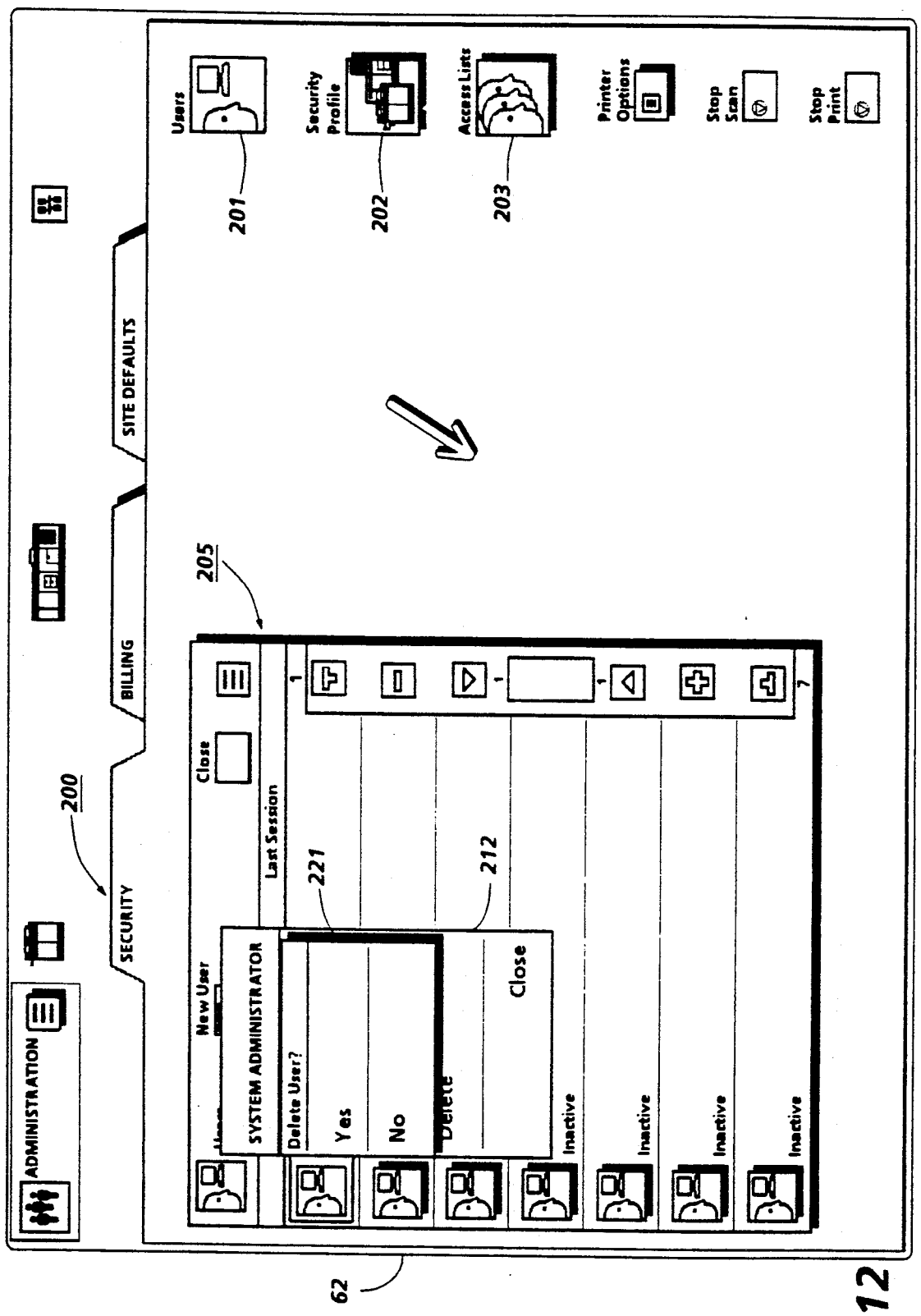
Figure 13:
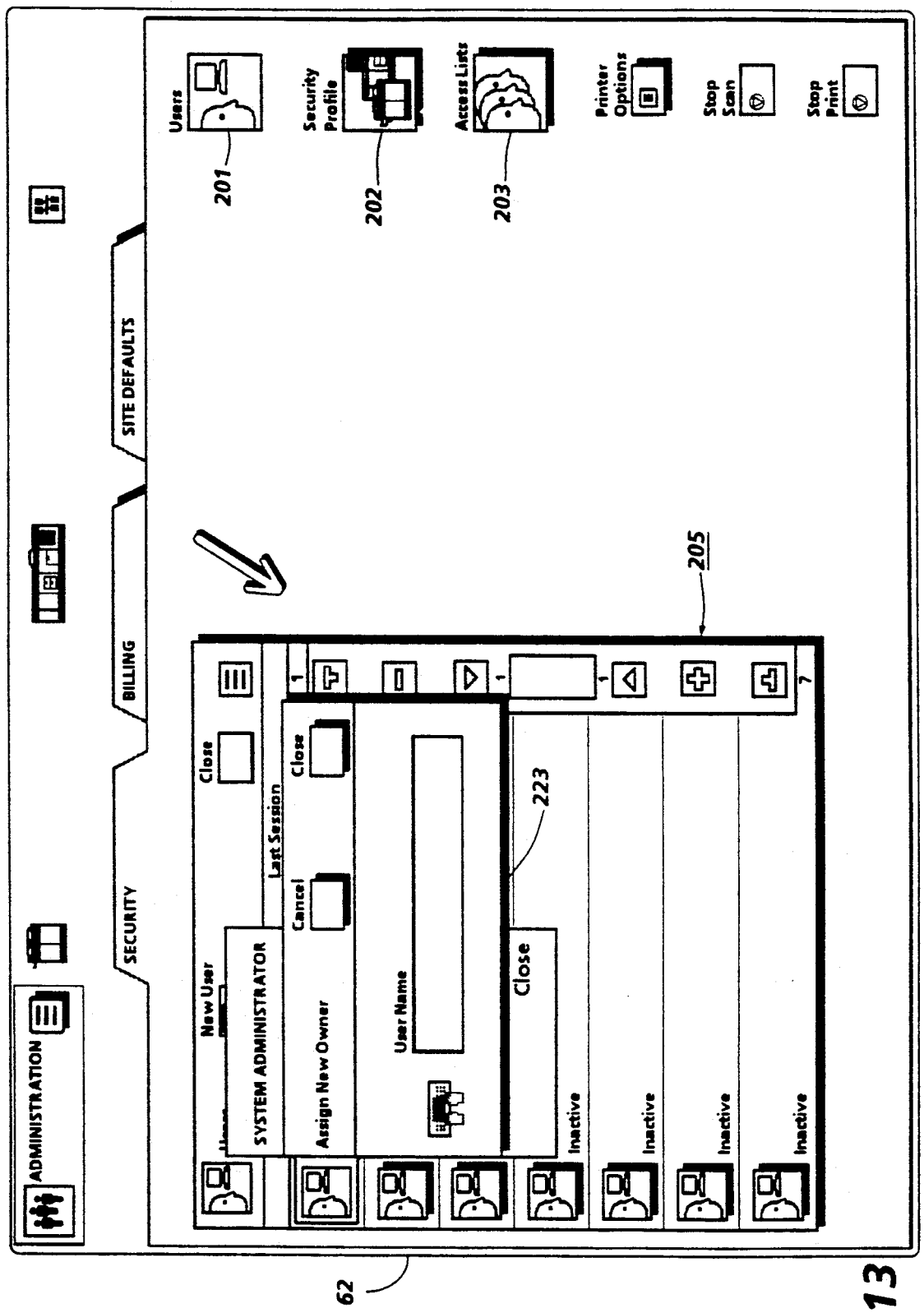
Figure 14:
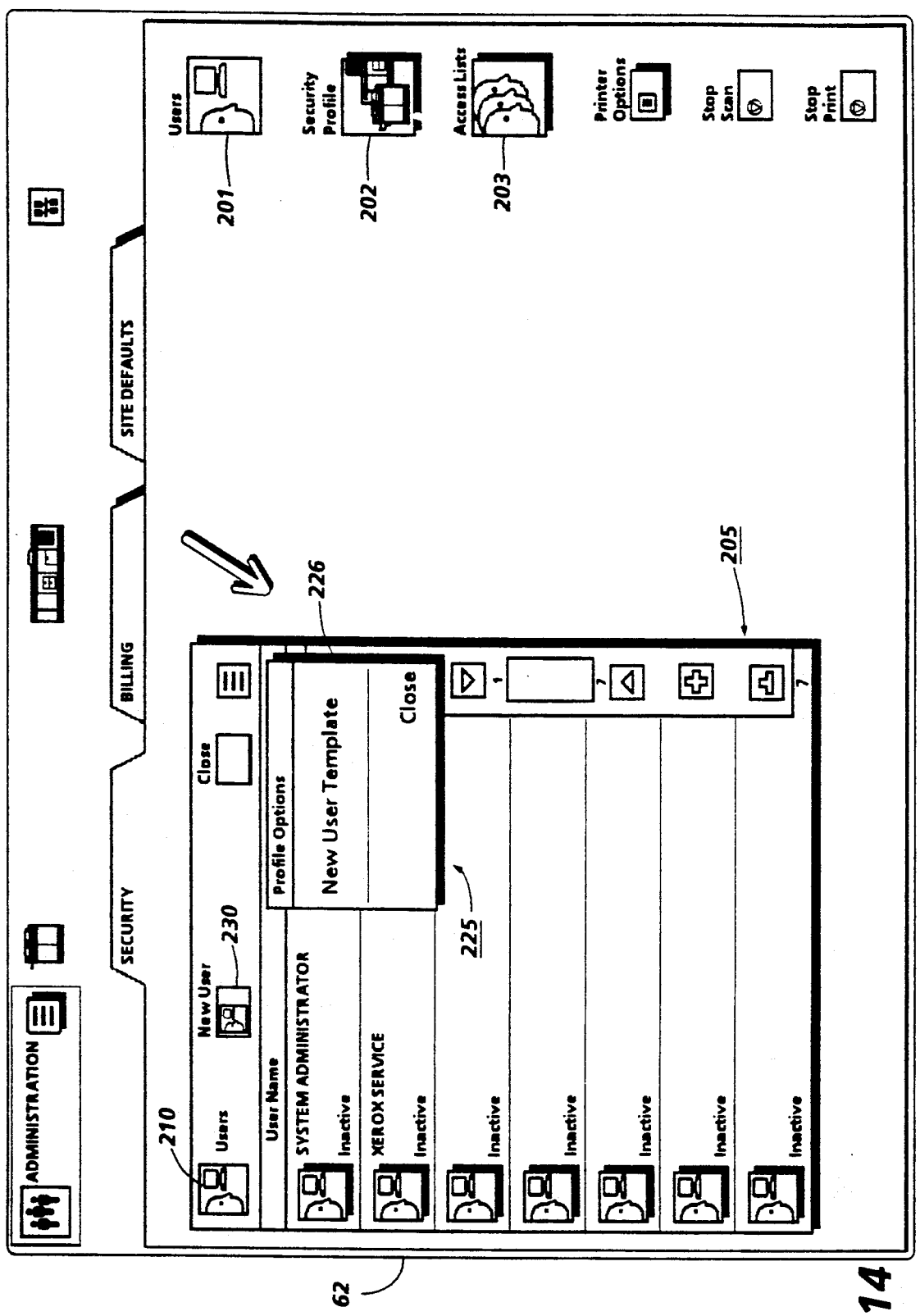
Figure 15:
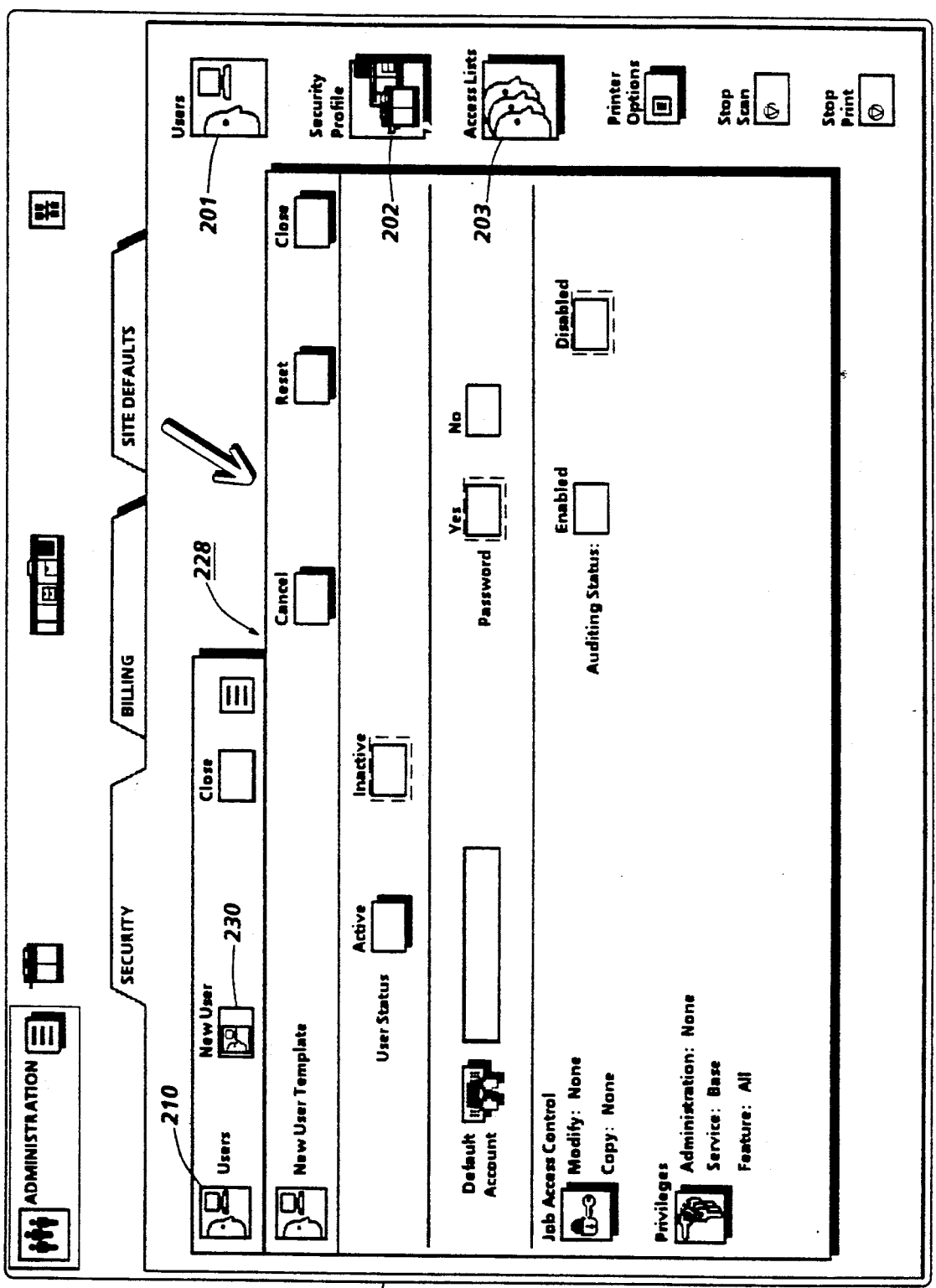
Figure 17:
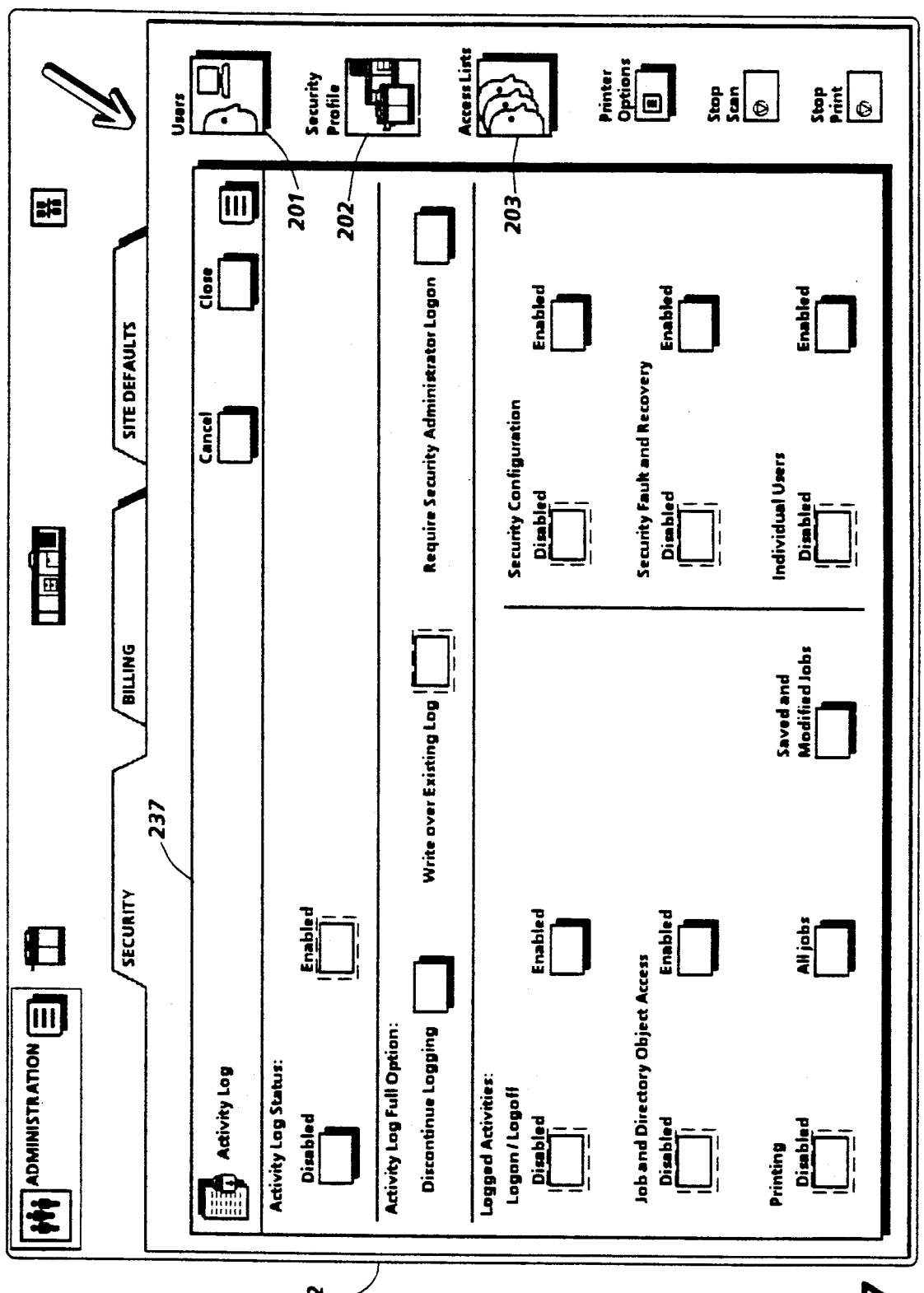
Figure 18:
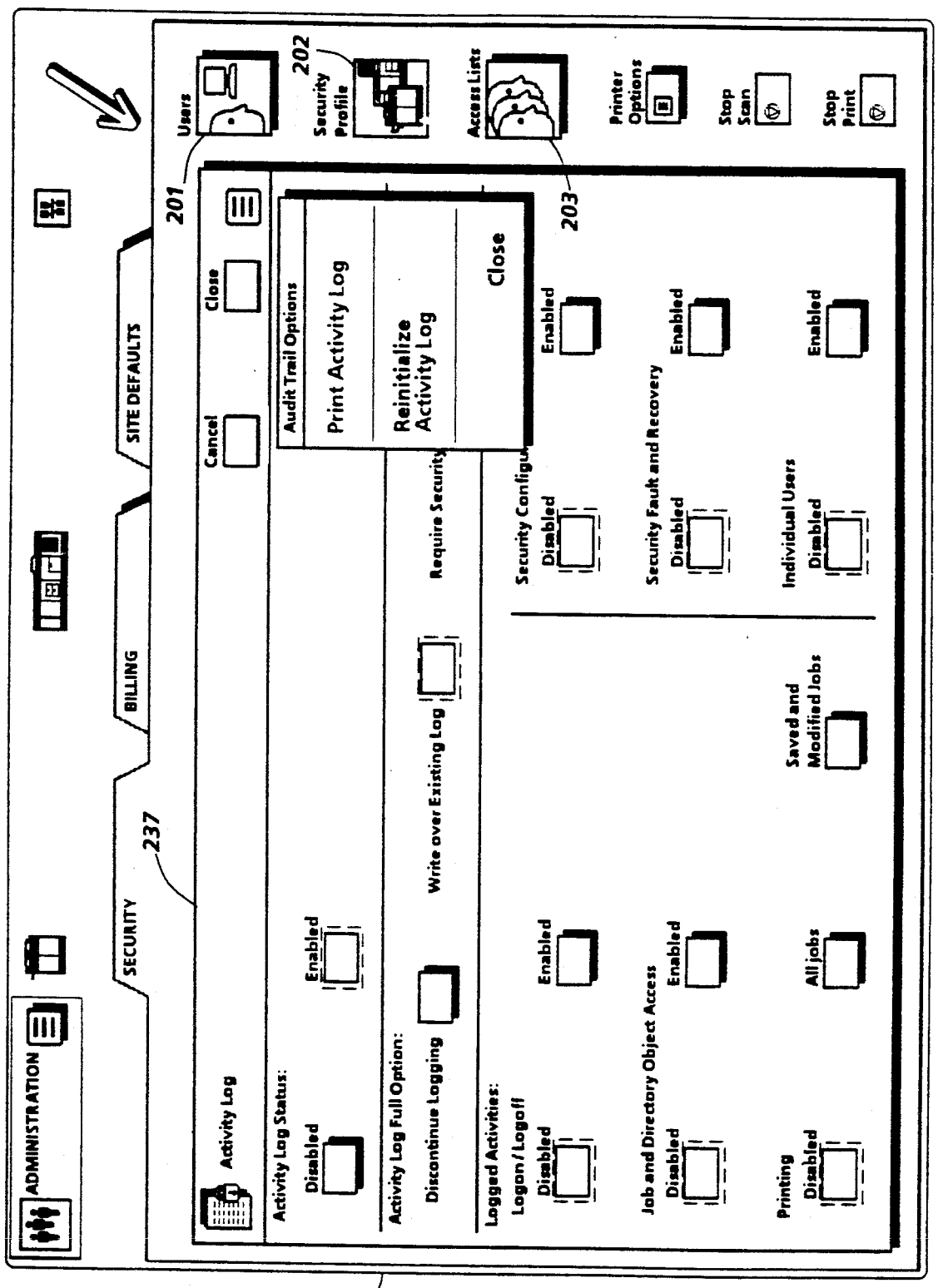
Figure 19:
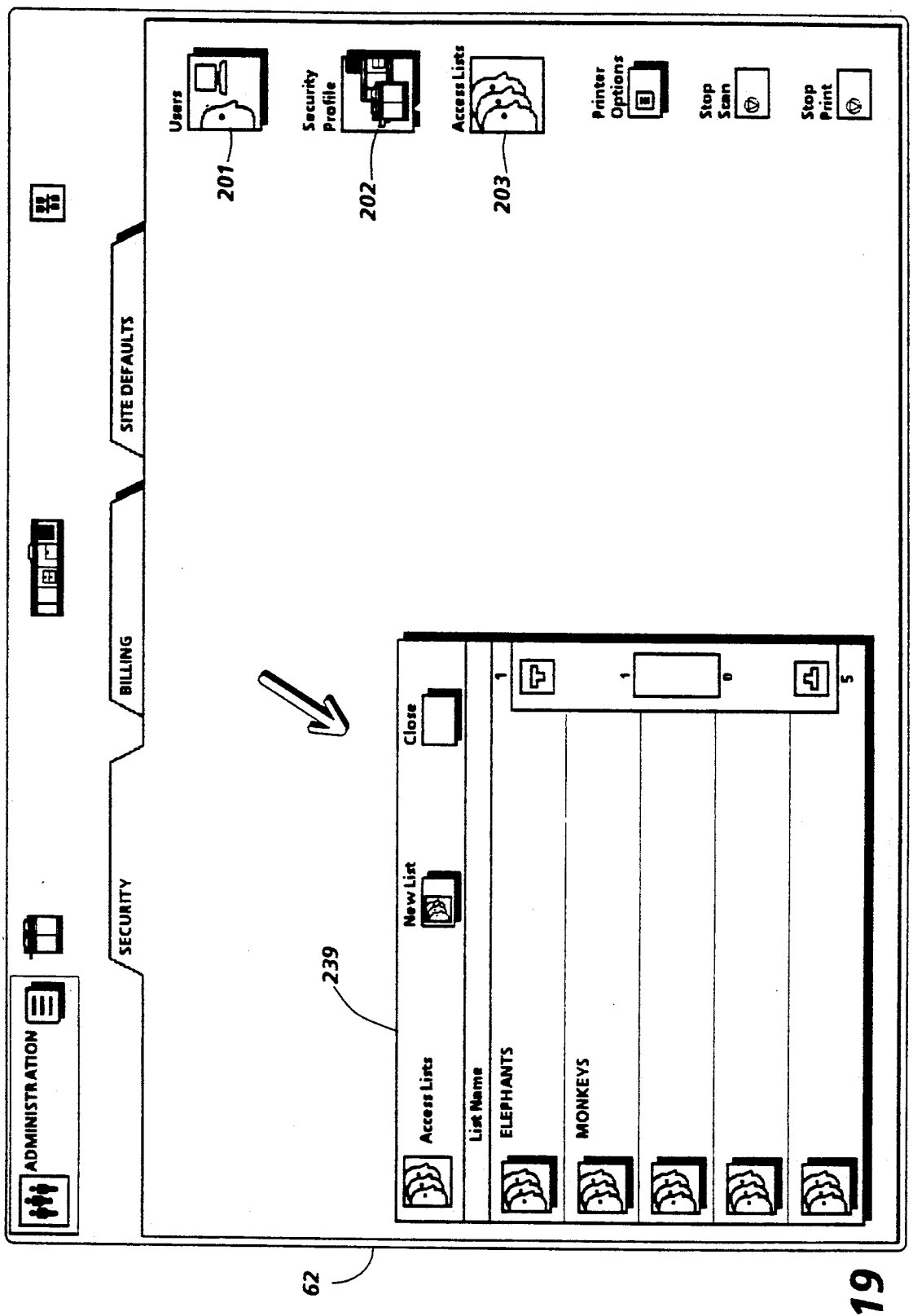
Figure 20:
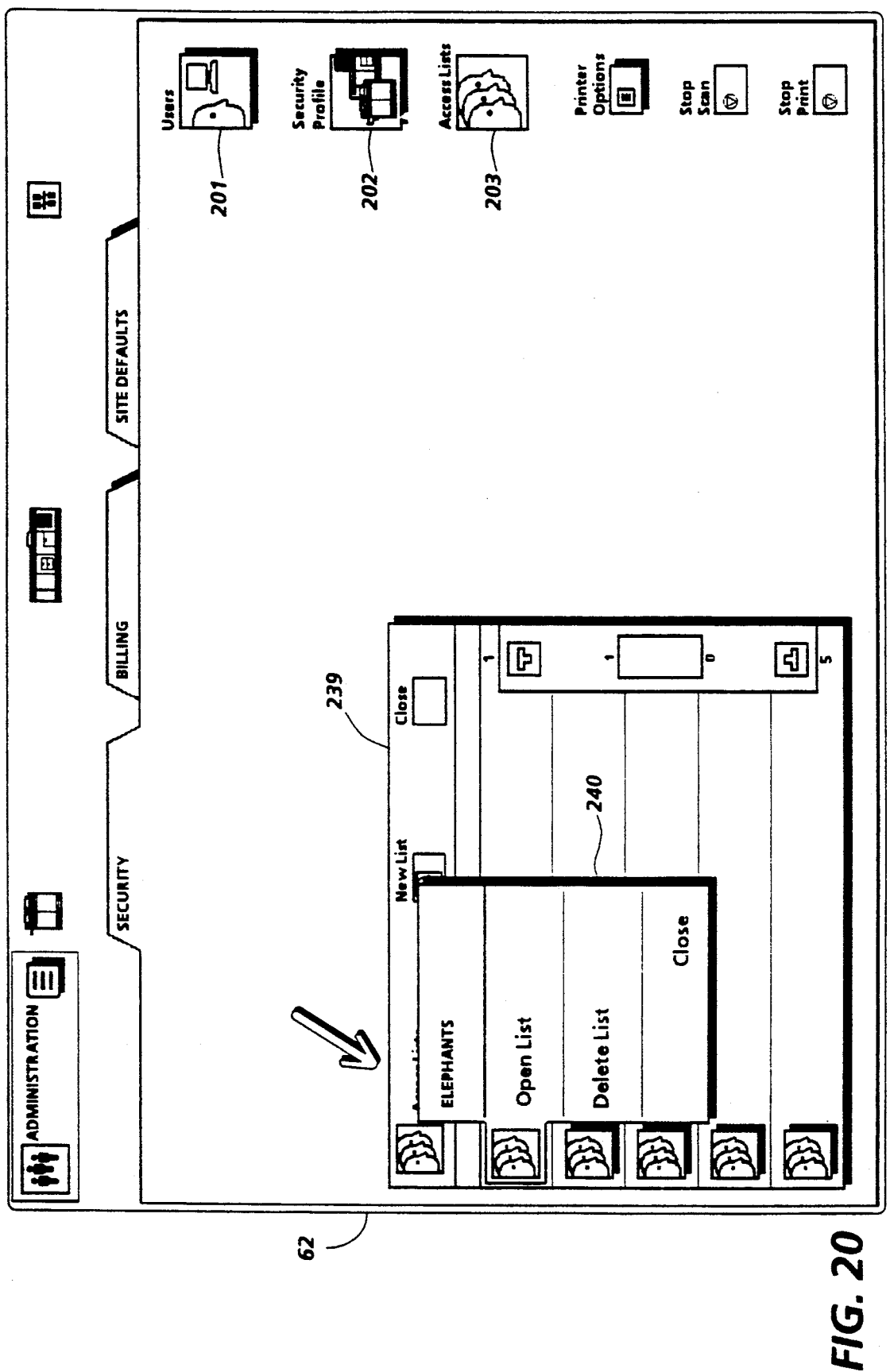
Figure 21:
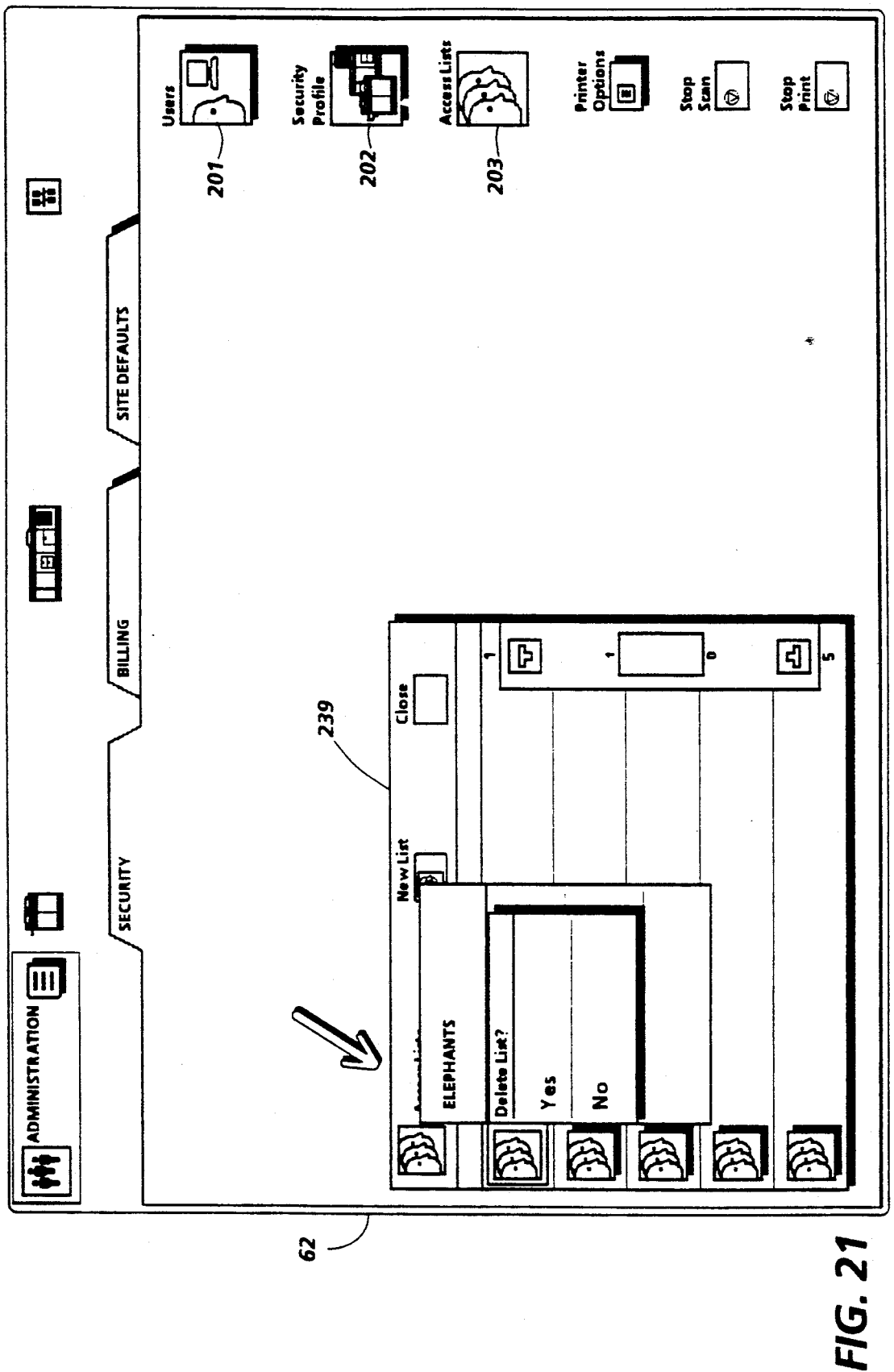
Figure 22:
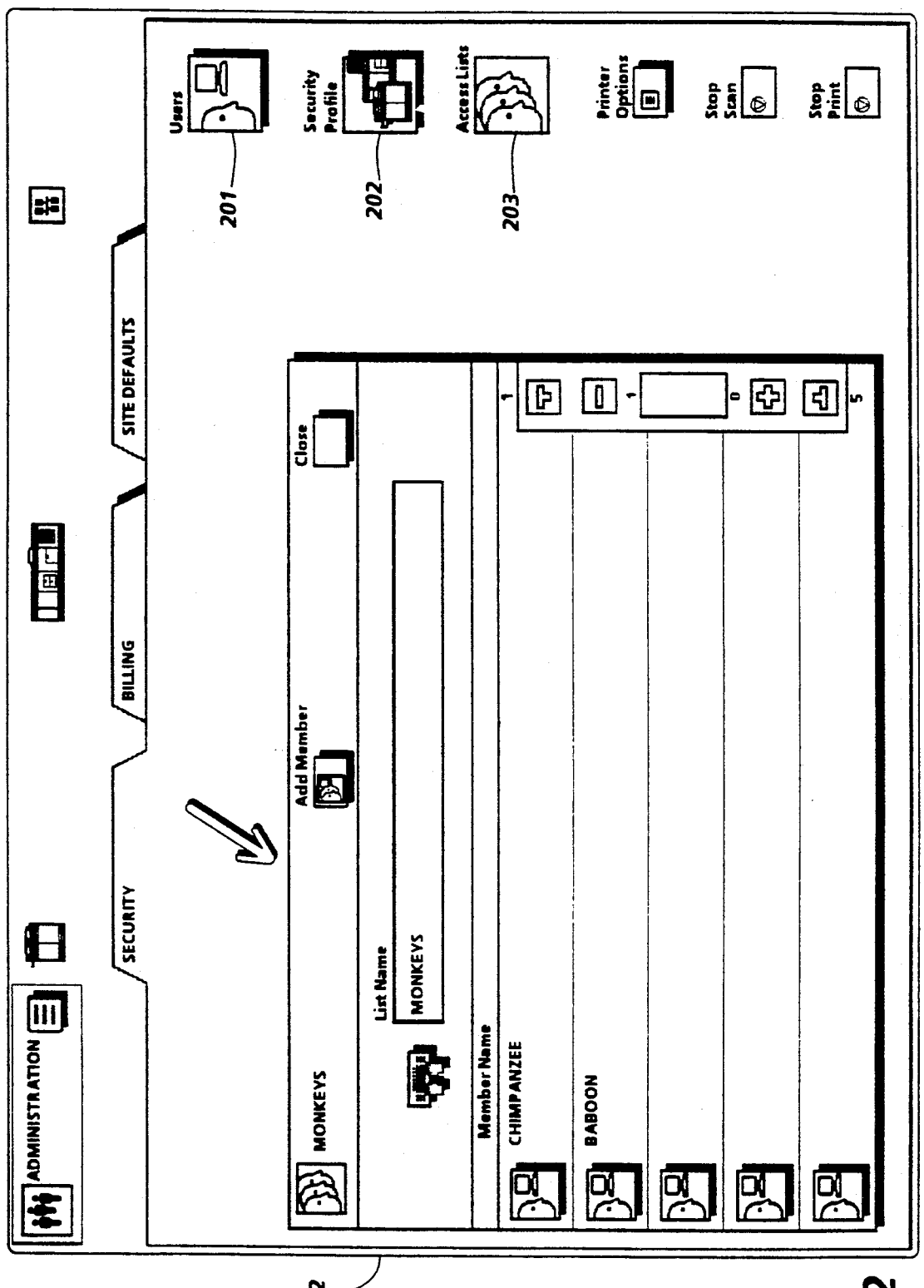
Figure 23:
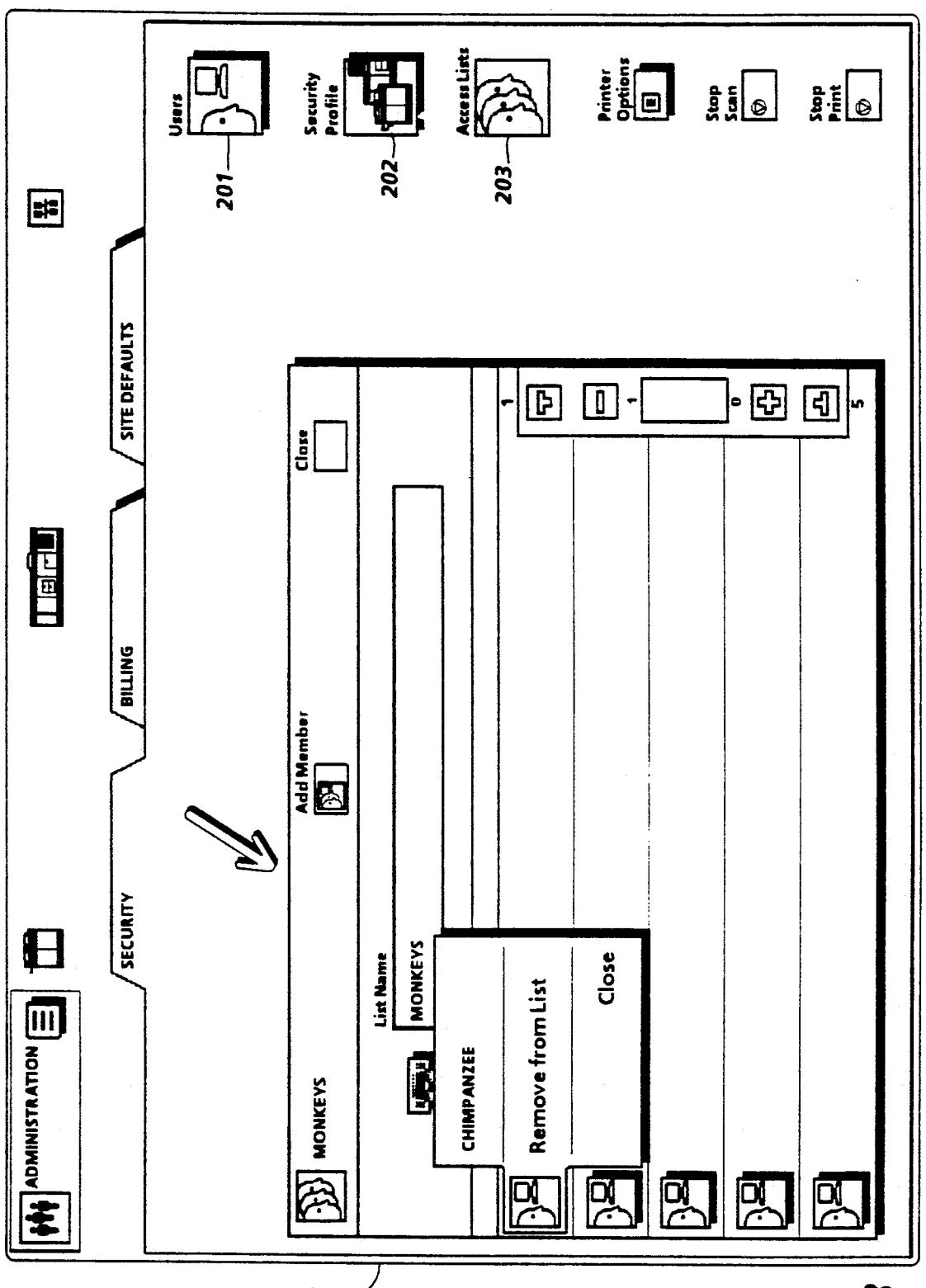
Figure 24:
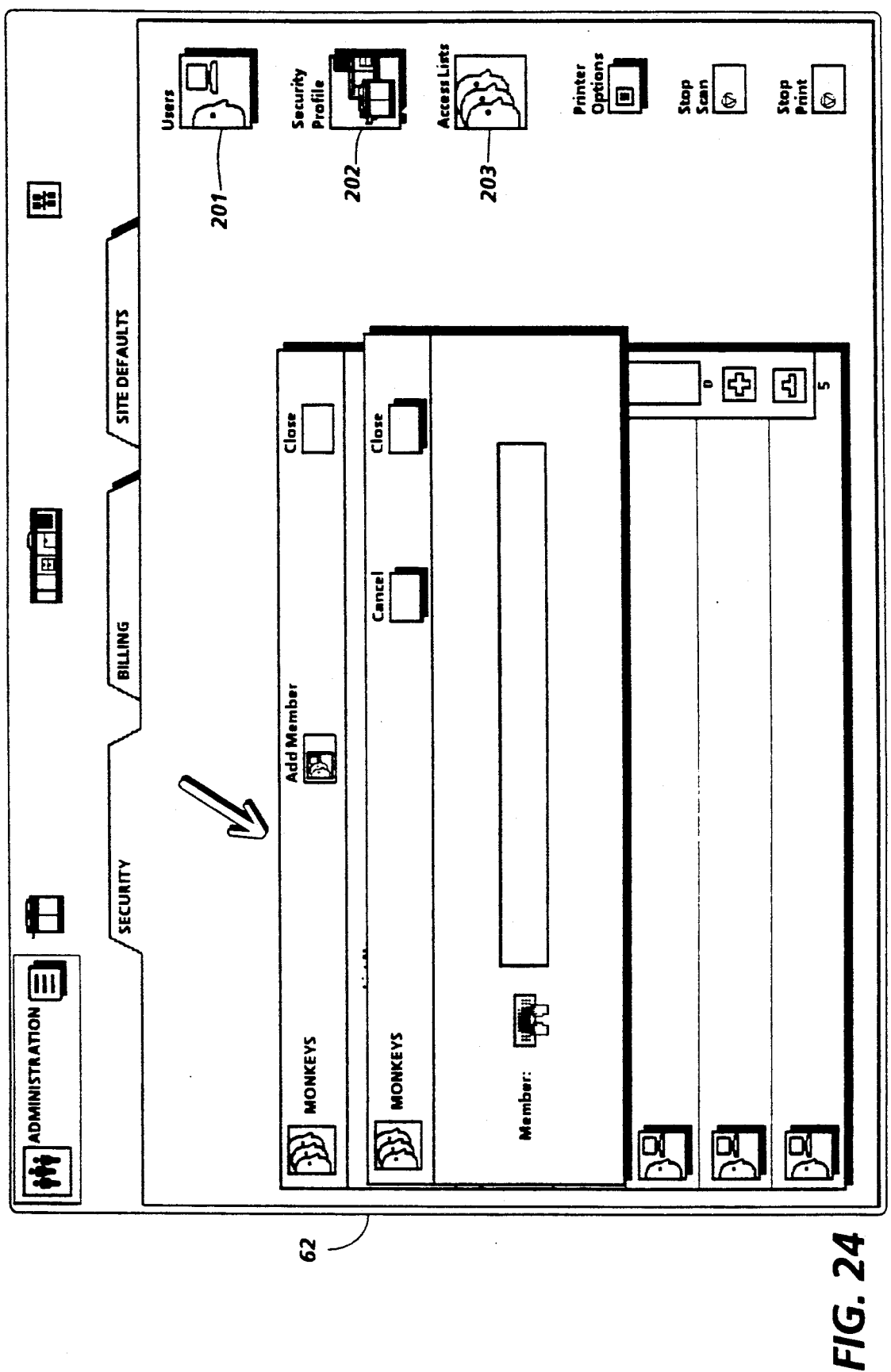
Figure 25:
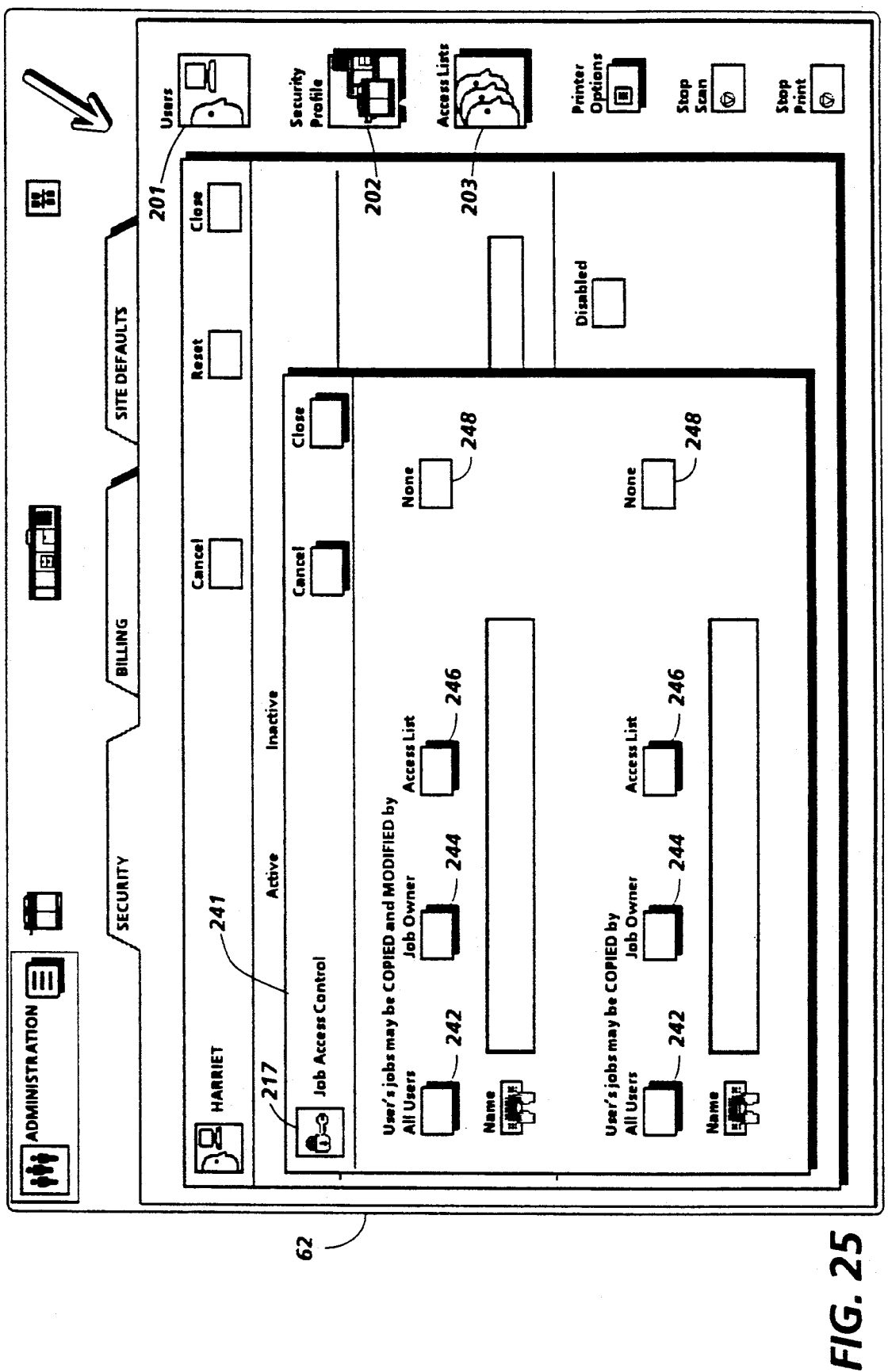
Figure 26:
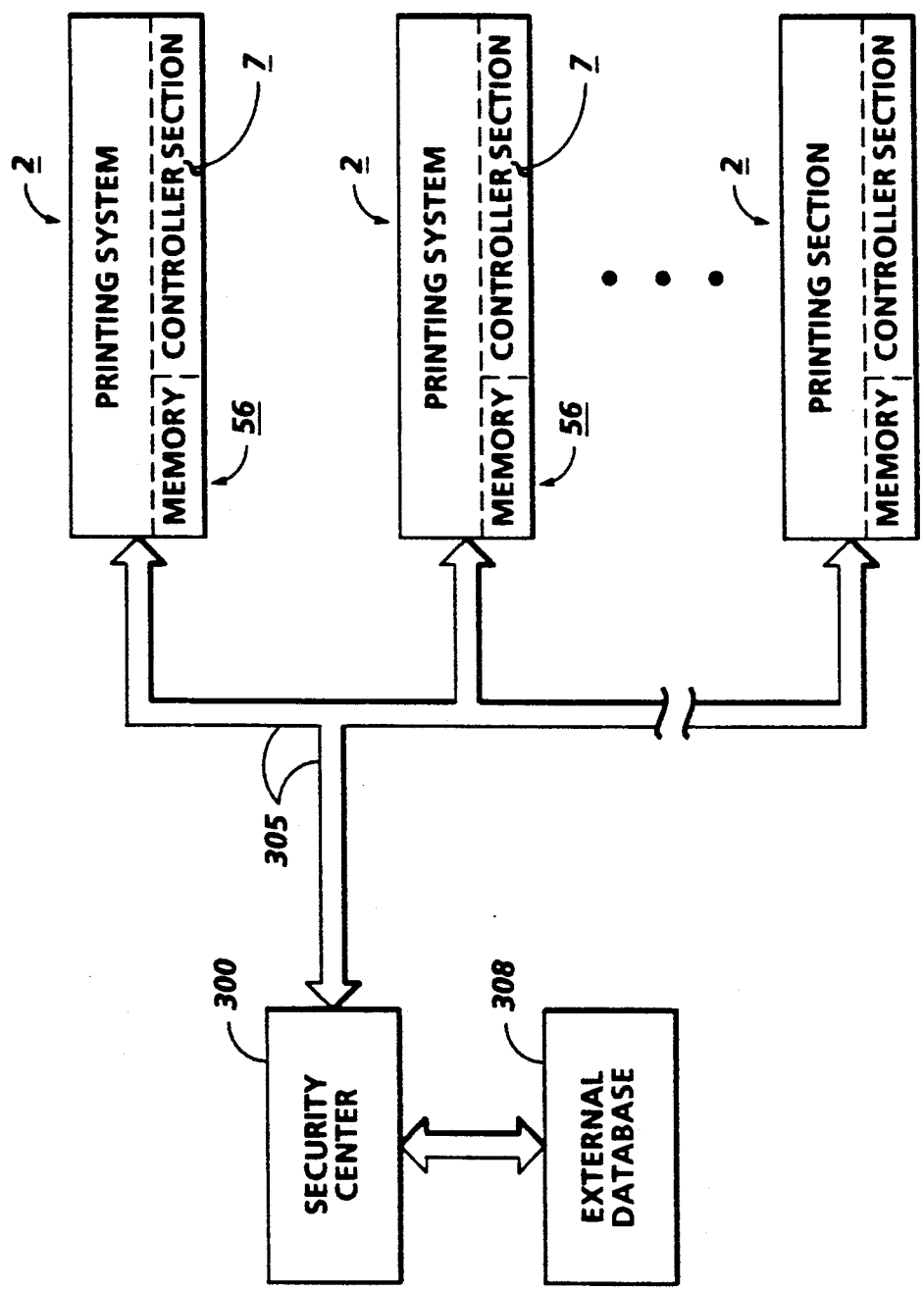

FIGS. 5A, 5B, and 5C comprise a schematic block diagram showing the major parts of the control section for the printing system shown in FIG.1;

FIG. 6 is a block diagram of the Operating System, together with Printed Wiring Boards and shared line connections for the printing system shown in FIG. 1;

Figure 7:
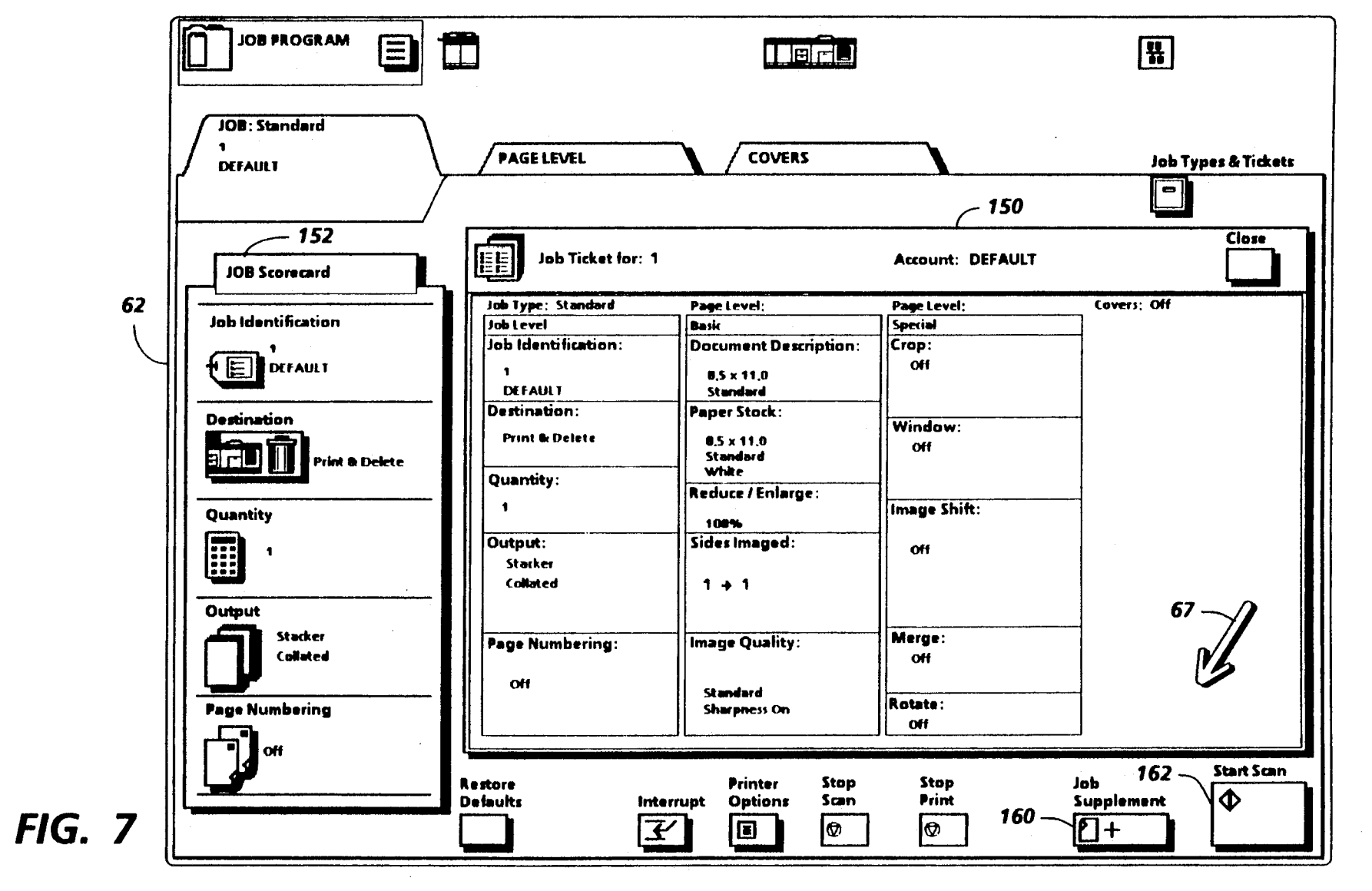

FIG. 7 is a view depicting an exemplary job programming ticket and job scorecard displayed on the User Interface (UI) touchscreen of the printing system shown in FIG. 1;

FIG. 8 is a view of the User Interface touchscreen on which is displayed a SECURITY card file having "Users", "Security Profile", and "Access Lists" icons, with the "Users" icon actuated to display a listing of users by name;

FIG. 9 is a view in which a user is selected by highlighting and opening a SYSTEM ADMINISTRATOR window providing processing selections;

FIG. 10 is a view displaying the User Profile for the user selected;

FIG. 11 is a view displaying the "Privileges" card file for the user selected;

FIG. 12 is a view showing the "Delete User?" options window opened;

FIG. 13 is a view showing the "Assign New Owner" options window opened;

FIG. 14 is a view showing the user "Profile Options" window opened to display the "New User Template" selections;

FIG. 15 is a view of the User Interface touchscreen showing the "New User Template" following selection;

Figure 16:
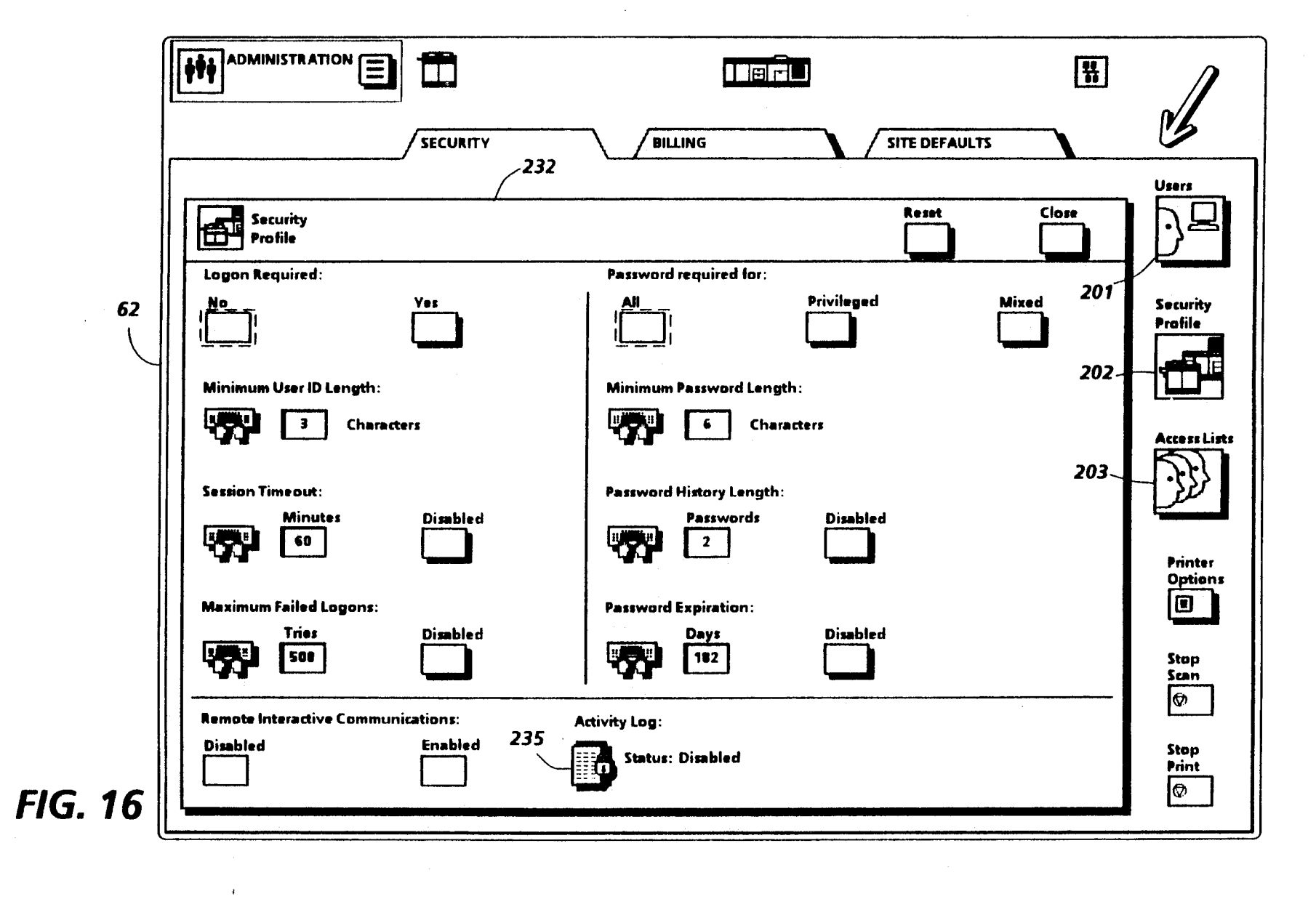

FIG. 16 is a view showing the "Security Profile" card file for the site;

FIG. 17 is a view showing the "Activity Log" for the site;

FIG. 18 is a view showing the "Activity Log" in FIG. 17 with the "Audit Trail Options" window opened;

FIG. 19 is a view of the User Interface touchscreen depicting the "Access Lists" card file;

FIG. 20 is a view showing the "Access Lists" card file of FIG. 19 with a file window opened to display list selections:

FIG. 21 is a view showing the "Access Lists" card file of FIG. 19 with the "Delete List?" window opened;

FIG. 22 is a view showing the "Member Name" file with names of members in a selected access list;

FIG. 23 is a view showing the "Remove from list" selection window for removing members from the selected access list;

FIG. 24 is a view showing the "Add Member" window for adding a member's name to the access list selected;

FIG. 25 is a view showing the "Job Access Control" card enabling a file owner to set the access rights to the owner's files; and FIG. 26 is a plane view of a second embodiment in which the security system is externally administered.

Figure 2:
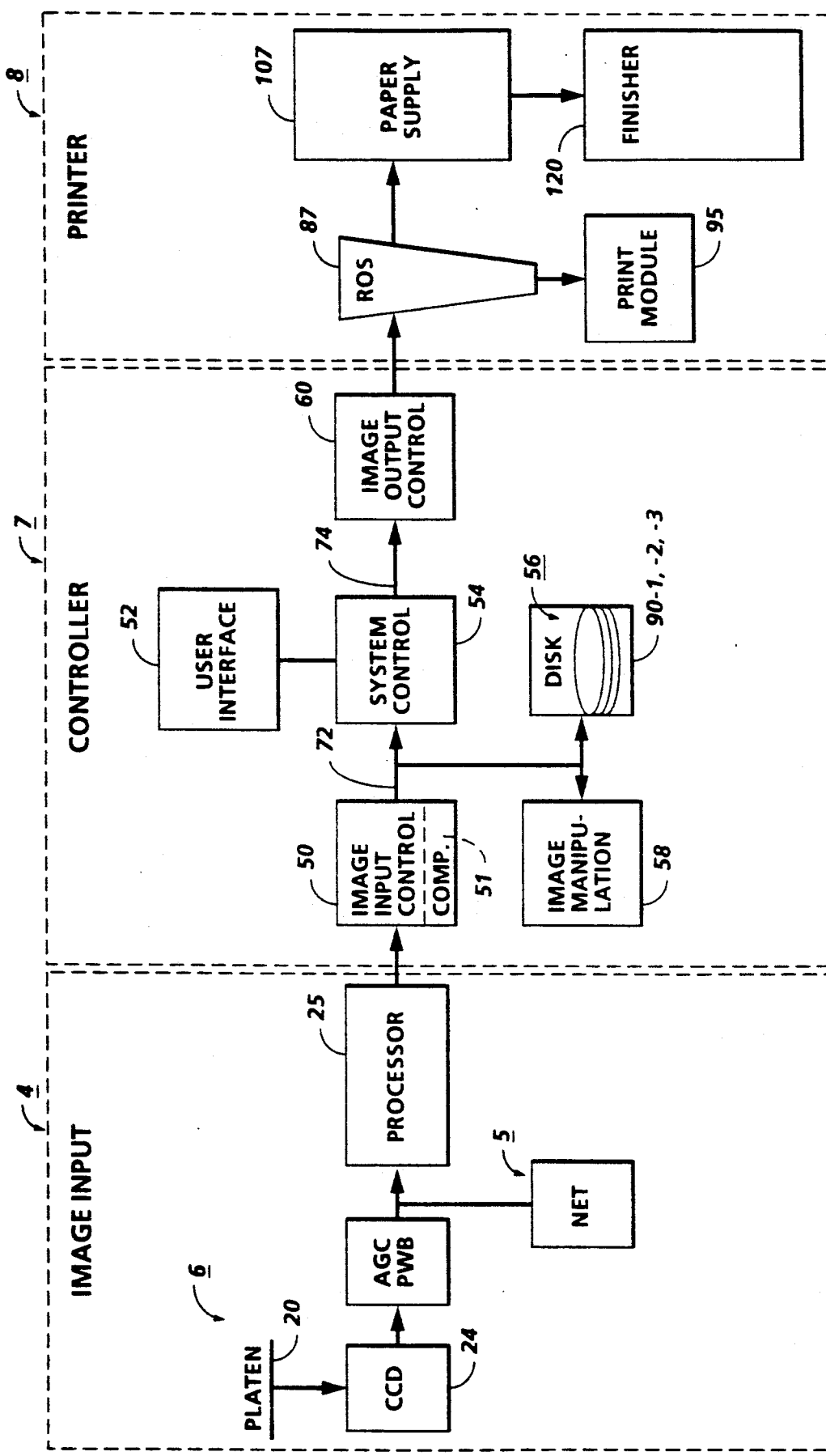
FIG. 2 is a block diagram depicting the major elements of the printing system shown in FIG. 1.

Referring to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc. While a specific printing system is shown and described, the present invention may be used with other types of printing systems. For example, printer section 8 may instead use a different printer type such as ink jet, ionographic, etc.

Figure 3:
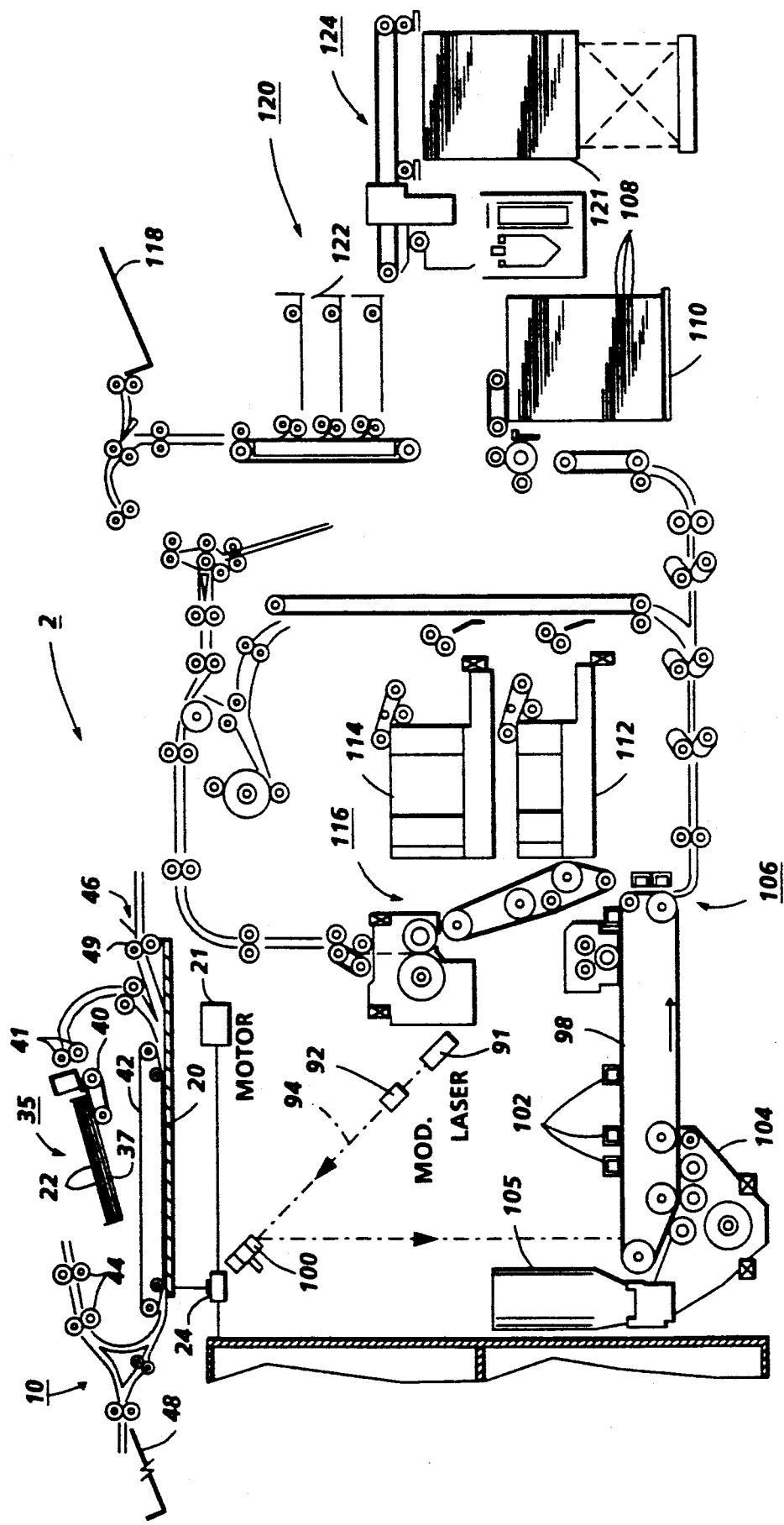
FIG. 3 is a plan view illustrating the principal mechanical components of the printing system shown in FIG. 1.
Figure 4:
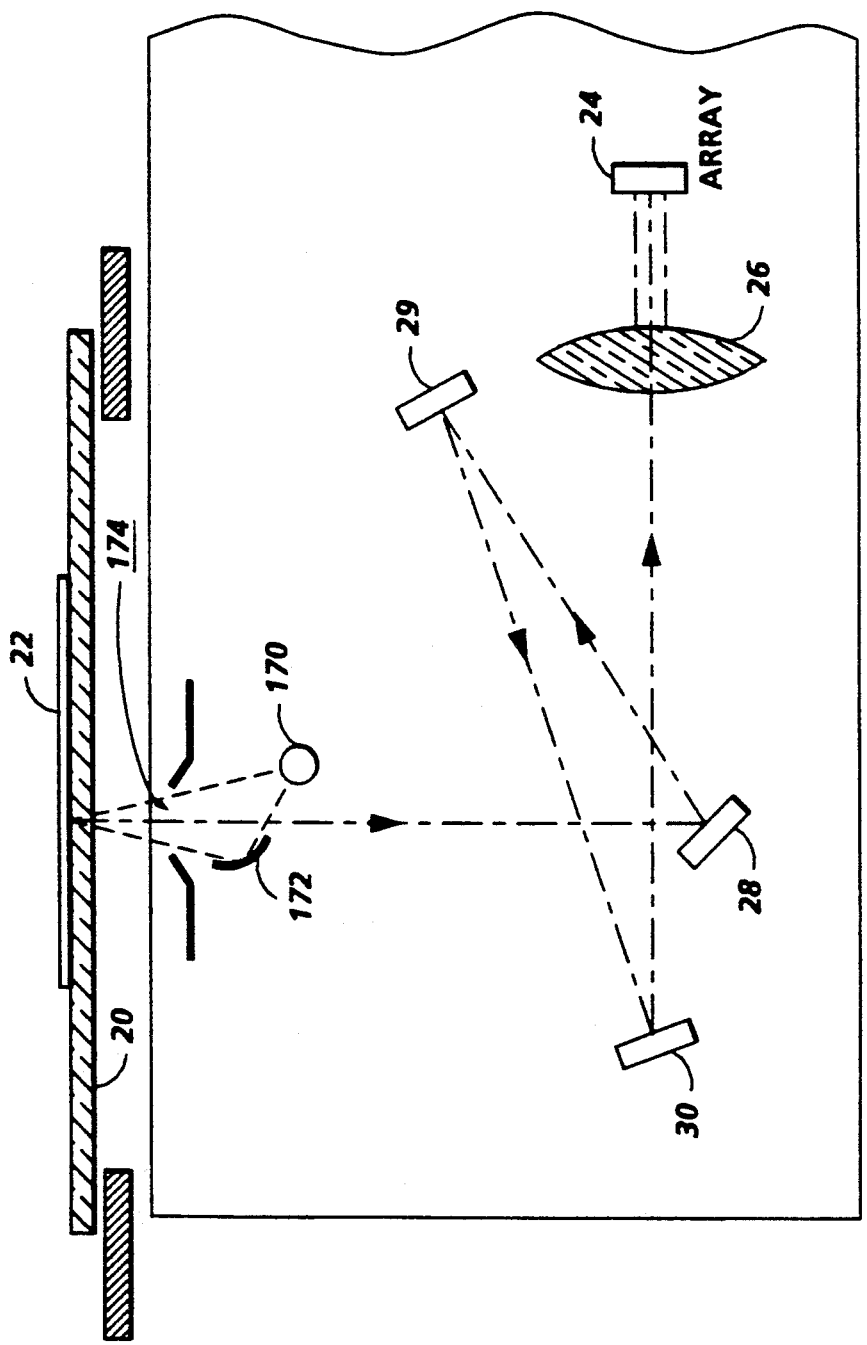
FIG. 4 is a schematic view showing certain construction details of the document scanner for the printing system shown in FIG. 1.

Referring particularly to FIGS. 2-4, for off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, etc. may be envisioned.

For on-site image input, section 4 has a document scanner 6 with a transparent platen 20 on which documents 22 to be scanned are located. One or more linear arrays 24 are supported for reciprocating scanning movement below platen 20 by motor 21. Lens 26 and mirrors 28, 29, 30 cooperate to focus array 24 on a line like segment of platen 20 and the document being scanned thereon. A lamp 170 and reflector 172 cooperate to illuminate the line-like segment being scanned through scan slit 174. Image data in the form of image signals or pixels from net 5 or array 24 are input to processor 25 for processing. After processing, the image signals are output to controller section 7.

Processor 25 converts the analog image signals output by array 24 to digital. Processor 25 further processes image signals as required to enable system 2 to store and handle the image data in the form required to carry out the job programmed. Processor 25 also provides enhancements and changes to the image signals such as filtering, thresholding, screening, cropping, scaling, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator (MOD) 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 having a developer supply 105 and transferred at transfer station 106 to a print media 108 delivered by Paper Supply section 107. Media 108 as will appear may comprise any of variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books 121 and a thermal binder 124 for adhesively binding the prints into books 121.

Referring to FIGS. 1, 2 and 5, controller section 7 is, for explanation purposes, divided into an image input controller 50, User Interface (UI) 52, system controller 54, main memory 56, image manipulation section 58, and image output controller 60.

The image data input from processor 25 of image input section 4 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

To control access to printing system 2 at a site and protect any sensitive data and files stored in the system memory, the security system of the present invention is provided. When invoked, a user in order to gain access to printing system 2 must authenticate himself by a special User Identification number (User ID). Where a password option is enabled, the user is also required to enter his password. As will appear, a Security administrator assigns the User ID while the user creates his own password when allowed to do so.

The site, which is the business location for the printing system 2, has the ability to define the level of security desired. Generally, the levels of security are:

(1) no security except for administrative functions controlled by either a site administrator or a security administrator. These administrative functions are the type which require access controls to protect sensitive information and performance variables for the system. At this security level, no user would be required to log onto printing system and each user would have full access to any function available on the system (2) a partially secure site would allow User IDs to be assigned to some users at the Security Administrator's discretion. This would give these users access to certain privileged system functions.

(3) a fully secured site where all users are assigned a User ID by the Security administrator.

(4) fully secured site with passwords would allow some or all users, at the discretion of the Security administrator, to employ their own password to contiol access to the user's own files that are in the system.

A Site administrator is normally provided (although one administrator may serve in both Site and Security Administrator capacities). The site administrator is considered a privileged user and as such has certain privileges over and above those of either a secure or non-secure user. The Site administrator typically establishes the programming features and functions that the site will have, the system default settings, i.e., restricting access to complex printer programming features to avoid printer downtime, restricting user access to preselected printer programming features to reduce personal use of the printer, etc., and has shared operating functions such as billing, accounting, etc.

A Security administrator is a trusted individual charged with the responsibility for creating and implementing the security rules of printing system 2 consistent with the security level desired by the site. In this capacity, the Security administrator controls access to the programming features, administration, and service of printing system 2. Programming functions and features comprise the different level of system job programming choices that are made available to a user by the Site administator. Security administration relates to the process by which security at the site is administered while service refers to the security that governs access by service or repair personnel (referred to herein as Tech Reps.).

To enable the Security administrator to carry out his duties, the Security administrator establishes and maintains a User Profile for each user. The User Profile allows the Security administrator to establish a security profile for each user to whom the Security administrator assigns a User ID plus other security enablements such as user passwords, rights to access different system programming functions, etc. depending upon the security level of the site. As will be understood, access to the user profile is limited to whatever rights the Security administrator has.

Referring to FIGS. 8-12 and APPENDIX A "User-Profile Module", on entering the "Administration" mode, there is displayed on touchscreen 62 certain card files including a "SECURITY" card file 200 on which are displayed "Users", "Security Profile", and "Access Lists" icons 201, 202, 203 respectively. Actuation of "Users" icon 201 causes a "User Name" file 205 to be displayed listing the names of all users at the site to whom a User ID has been assigned, the user's ID, and whether the user is "Active" or "Inactive". Up and down scrolling icons 207, 208 permit scrolling of file 205 to allow reading of all the user names.

Where the Security administrator desires to view the User Profile for a particular user, a "Users" icon 210 in "Users Name" file 205 is actuated to display a "SYSTEM ADMINISTRATION" window 212 having "Open Profile", "Activate", "Delete", and "Close" selections. Moving window 212 so that the window pointer 212' is opposite the name of the user whose User Profile is to be viewed and actuating "Open Profile" displays the User Profile 215 for the user name selected. As shown in FIG. 10, User Profile 215 identifies the "User Status", "User Name", "User ID", whether the user has a password or not, and the user's "Default Account". Additionally, a "Job Access Control" icon 217 and a "Privileges" icon 219 are displayed.

Selecting "Privileges" 219 displays the privileges granted to the user as shown in FIG. 11. These consist of "Administration", "Service", and "Feature Access".

The Security administrator ordinarily has "Administration" privileges for "Security" while the Site administrator has privileges for "Site". A single person may have privileges for "Both". Special ID numbers prevent users from gaining access to the security and administration functions performed by the administrator or administrators.

Referring to FIGS. 9, 12, and 13, actuating "Delete" in window 212 displays a "Delete User?" window 221 with "Yes" and "No" options. Actuation of "Yes" deletes the current user and displays an "Assign New Owner" window 223 through which the Security administrator can assign a new owner for the former user's jobs currently in the system if desired. For this, and referring to FIGS. 14-15, a "Profile Options" window 225 is opened displaying a "New User Template" selection 226. Actuation of the "New User Template" 226 displays the template 228 seen in FIG. 15 by which a User Profile 215 for the new user is created.

A similar procedure is followed where a "New User" is to be added to the users given access to printing system 2. In that case, the "New User" icon 230 in "Users Name" file 205 (FIG. 8) is actuated.

The Security administrator may also be given the ability to set up certain user independent functions such as the number of attempts a user can make to logon before lockout, minimum User ID length, minimum password length, etc. depending on the security level of the site. For this, and referring to FIGS. 8 and 16, the Security Profile icon 202 is actuated to display "Security Profile" scorecard 232 showing the current security setup of the site. These include whether or not user logon is required ("Logon Required"), the minimum number of characters in the user's ID ("Minimum User ID Length"), the length of a sessions ("Session Timeout"), the maximum number of logon attempts by a user that are allowed ("Maximum Failed Logons"), if a password is required ("Password required for"), the "Minimum Password Length", "Password History Length", and "Password Expiration".

An "Activity Log" icon 235 enables the Security administrator to access data when auditing security relevant functions and to activate auditing functions which will monitor and log system data, user logon/off, access to secure items, power on/off, etc. Actuating icon 235 displays an "Activity Log" scorecard 237 (FIG. 17) with a series of system auditing options for monitoring the number of times certain activities such as "Logon/Logoff", etc. take place. The site security enablements such as "Security Configuration" are also displayed for selection together with an option to print out a hard copy of the activity log ("Print Activity Log") and to reset the log ("Reinitialize Activity Log") as shown in FIG. 18.

Referring to FIGS. 8 and 19-24, the Security administrator may also set up access lists grouping users who have security access to a common file. Actuating "Access List" icon 203 displays a card file 239 of names for a specific job with a selection window 240. As in the case of individual users discussed previously, the Security administrator may select a list for deletion (FIG. 21), or open a list to display the members names (FIG. 22), or remove individual members from the list (FIG. 23), or add new members to the list (FIG. 24).

As will be understood, the set of operations and program selections which an user is allowed to perform on a particular job or directory object is a direct consequence of the user's clearance. Control over access to jobs and data stored in printing system 2 originates with the data creator or owner and governs the operations which a user is allowed to perform on files resident in the system.

Referring to FIGS. 10 and 25, actuation of "Job Access Control" icon 217 displays a "Job Access Control" scorecard 241 allowing a user to impose security restrictions on the user's files or jobs that are resident in printing system 2. The security limitations fall into two general classes: "COPIED and MODIFIED" and "COPIED" only. Each class is subdivided into: "All Users" 242, "Job Owner" 244, "Access List" 246, and "None" 248. "All Users" allows anyone to modify and/or copy the user's jobs, "Job Owner" allows only the job owner to modify and/or copy the user's jobs, "Access List" lists the names of users who are allowed to modify and/or copy the user's jobs, and "None" prevents anyone, including the job owner, from modifying and/or copying the user's jobs.

Tech Reps have their own security protection in the form of a Tech Rep ID number which is assigned either when printing system 2 is manufactured or when system 2 is installed. The Tech Rep ID number can be used to control down to the work support group level or any other service control level desired.

Once the Tech Rep ID number is assigned, the service organization to which the Tech Rep belongs can assign a password to protect both the service organization and the site by limiting access to only Tech Reps who have the correct password. The Tech Rep password can be changed at any time by the service organization. Further the service organization can assign special Tech Rep passwords to each site to further enhance site and/or the service organization security requirements.

Additionally, the service organization can also assign advanced levels of servicing access to selected personnel at individual sites. Typically this would be to site personal who have attended special training courses enabling them to perform more difficult and complex service operations on printing system 2 than the typical user would be able to do. The Site administrator normally would decide the site personal to be selected for this purpose with the Security administrator controlling special service access rights through "Service" selection under "PRIVILEGE" as shown in FIG. 11.

While files are protected through the password mechanism and/or by the ability of a user to decide the appropriate access rights of others to the user's files as described, the operator also has the ability to assign a security label to a file. To enable the use of security labels, the system described and claimed in copending application Ser. No. 07/590,633, filed on Sept. 28, 1990, entitled "Process For Merging Logos With Prints Produced By Electronic Printing Machines" in the names of Hengst et al (Attorney Docket No. D/89288) and incorporated by reference herein may be used for this purpose. A folder for security labels is stored in the system Merge Library into which the operator places his security label(s). In doing so, the user can identify the location of the security label on the page and the page side on which the security label is to appear. Printing system 2 assures that once selected, the user's file will never be displayed on touchscreen 62 or printed by printer section 8 without the security label selected by the user being present. In addition, printing system 2 provides the operator with the option of placing the security label in the background of the image displayed on touchscreen 62 or printed by printer section 8. This prevents anyone from removing the label since the security label will appear associated directly with the image itself.

In addition to security labels, printing system 2 provides the capability of printing other label types such as labels with an automatic date-time stamp along the edge or edges of the image displayed or printed, a label identifying the site of the printing system making the prints, a label identifying the image owner, etc.

Referring to FIG. 26, while a security system internal to a printing system 2 has been shown and described, control over the security of one or more sites may be established from a remote site, referred to herein as security center 300. Center 300 is coupled to the printing system site or sites by a communication channel 305 such as a telephone wire. An external data base or memory 308 at security center 300 serves as a storage medium for the users' User Profiles 215 and ID numbers following establishment by the Security administrator. The users individual passwords are stored in the internal data base or memory 56 of the printing system that is used by the user.

In order to gain access to one or more of the printing systems 2, the user enters his user ID number and password using keyboard 64. The user ID number is transmitted via channel 305 to the external data base 308 where a comparison is made with the user ID numbers held in data base 308. Where the user ID number entered at the site by the user matches a number held in data base 308, an authentication signal is sent via channel 305 to the printing system controller section 7, authenticating the user. Concurrently, the password entered by the user is compared with passwords held in the system internal data base and where a match is found, a second authentication signal is generated and sent to controller section 7 of the printing system. On receipt of user authentication, controller section 7 enables the user to access the printing system.

While the invention has been described with reference to the structure disclosed, it is not confined to the details set forth, but is intended to cover such modifications or changes as may come within the scope of the following claims.

APPENDIX A

1.0 UserProfile Module Public Procedure Descriptions

1.1.0 UPSecAdmin

The UPSecAdmin interface defines the procedures that client software should call in order to allow a person with security administrator privileges to maintain the UserProfile database outlined in the Access Control model.

Before making calls to any procedures listed within this interface, clients are required to have previously registered an operator with Security Administrator privileges with the system. (through SessionBegEnd.Logon) If this hasn't been done, the status. 'insufficientPriv' will be returned.

1.1.1 Type Definitions

```
SeqUsers: TYPE = RECORD [
    numUsers: CARDINAL = 0,
    userList: SEQUENCE length: CARDINAL OF UserRecord];
```

SeqUsers defines the record that will be returned when the database is queried for a list of operators.

```
UserList: TYPE = LONG POINTER TO SeqUsers;

UserRecord: TYPE = RECORD [
    userName: UserProfile.UserName,
    lastSession: UserProfile.Session,
    profileState: UserProfile.ProfileState];
```

UserRecord defines the information that is reported about each operator on a call to 'ListUsers'.

1.1.2 Return Status Descriptions

```
StatusCode: TYPE = { ok,             -- call completed normally
    notfound,       -- userName specified was not found in the database acctNotFound,   -- account specified isn't a valid account on the system
    acctInactive,   -- account is resident in the system but not valid for billing
                    -- purposes.
    mustHavePwd,    -- password is required for this profile entry
    pwdTooLong,     -- password string is too 'long'
    pwdTooShort,    -- password string doesn't meet site defined length
    pwdNotRequired,  -- Password is not required for this particular user
```

```
idInUse,      -- UserID is already present in the database
idTooLong,    -- UserID string length is too long
idTooShort,-- UserID string doesn't meet site defined length nameInUse,    -- UserName is already present in the database
nameTooShort, -- UserName is too short
nameTooLong,  -- UserName is too long outOfBounds,  -- starting point given to ListUsers is greater than
              -- current SizeDBase - 1;      (        )
shortList,    -- unable to return the numbers of users that were requested insufficientPriv, -- The current operator does not have Security Administrator
                  -- admin privileges.

nilString, -- dBase only deals in "0" or greater length strings:  (      )

notAllowedOnCSR,  -- Operation is not allowed on the      Customer
                  -- Service Representative (CSR)
notAllowedOnDefaultUser, -- Operation is not allowed on the Default User
notAllowedOnNewUser,     -- Operation is not allowed on the NewUser
notAllowedOnOnlySecAdmin, -- Operation is not allowed on the only
                          -- Security Administrator for the system.
notAllowedOnPrivUser, -- Operation is not allowed on the "Privileged User"

dBaseDisappeared, -- database backing file was trashed from disk
                  -- without UserProfile Manager's knowledge:   (       )
noRoom, -- no room in the backing file to add a new user knownSoftwareBug, -- Known software error caught.  StatusCode will
                  -- be added into the next release of software acConfigNotLoaded, -- ACConfig Database is not-loaded:    (      )
notYetLoaded,      -- UserProfile Database is not loaded: (      )
acctDbaseNotLoaded -- Billing & Accounting Database is not loaded:  (      )
};
```

StatusCode defines all the possible status codes that can be returned as a result of making calls through procedures defined within the interface. Note: To find out which of the above can be returned by an individual procedure, a client should consult comments contained within UPSecAdmin.mesa definition file.

```
StatusRecord: TYPE = RECORD [
    numCodes: CARDINAL = 0,
    codes: ARRAY [0..maxNumCodes) OF StatusCode = ALL[ok]];
```

In cases where there may be more than one thing wrong with the input to a procedure, (AddNewUser) a variable of type StatusRecord is returned to tell clients all problems. Clients should check 'numCodes' to see how many problems were found and look at 'numCodes' elements of the 'codes' array to find out what they are.

1.1.3 Database Modification Procedures

The database modification procedures defined below validate data passed to it against Access Control Model Standards governing changes to the UserProfile Database by a Security Administrator. If the data meets the standards, the modification request is then forwarded to the UserProfile Database Manager for final execution.

```
AddNewUser: PROCEDURE [user: UserProfile.SecAdminModifyHandle]
    RETURNS [status: StatusRecord];
```

After validation of all fields in 'user', a new profile entry containing the Security
Administrator settable fields found in 'user' is added to the UserProfile Database.
If any invalid fields are found within 'user', they will be reported through 'status'
and no change will be done to the database.

Restrictions enforced during the validation process are:

- CSR Service privilege can not be granted to any new operator
- UserName must be unique within the database
- UserID must also be unique. Its length must range between the site-defined
  minimum to an 11 character maximum.
- Password must be specified if required. Its length must range between the
  site-defined minimum to a 40 character maximum. During the first successful
  logon of an operator requiring a password, a password change using
  UPOperAdmin.ChangeProperty should be forced upon the operator by the client.
- Maximum size of the database is 100 operators. This maximum does not include
  the "New User", "Default User", or "CSR" profile entries. [i.e. actual
  maximum is 103 entries]
- DefaultAccount: Must be an active account within the Billing And Accounting
  Database

```
ChangeProperty: PROCEDURE [
    name: UserProfile.UserName, newSetting: UserProfile.SecAdminModProp]
    RETURNS [status: StatusCode];
```

After validation, the Profile Property specified by the 'newSetting' variant is
changed for 'name'.

Restrictions for a given field are the same as in 'AddNewUser' plus:

- CSR Service privilege can not be revoked
- Password: History is not enforced (acts as a Password Overwrite)
- Security Administration privilege can not be revoked if operator is the only
  one.
- PasswordRequired is necessary for all privileged users. Must also conform to
  the Security Default, 'PasswordUserSet'.
- ProfileState of an only Security Administrator may not be deactivated.

```
    DeleteUser: PROCEDURE [name: UserProfile.UserName]
        RETURNS [status: StatusCode];
```

Deletes profile entry for 'name' from the UserProfile Database provided the deletion
doesn't break any restrictions.

Restrictions:

- Not allowed with the CSR, "Default", or "New" user entries.
- Not allowed to delete an only Security Administrator entry 1.1.4 Database Query and Reporting Procedures

```
    IsAccountValid: PROCEDURE [account: AccountMgrCommon.AccountNumber]
        RETURNS [status: StatusCode];
```

Validates the 'account' string against the master account list. Result of query is found in 'status'.

IsPwdStringValid: PROCEDURE [password: LONG STRING]
    RETURNS [status: StatusCode];

Verifies whether 'password' meets the site defined standards. Result of query is found in 'status'.

IsUserIDValid: PROCEDURE [id: UserProfile.UserID]
    RETURNS [status: StatusCode];

Verifies that 'id' meets site defined standards and also whether it is unique within the UserProfile database. Result of query is found in 'status'.

IsUserNameValid: PROCEDURE [name: UserProfile.UserName]
    RETURNS [status: StatusCode];

Verifies that 'name' meets site defined standards and also whether it is unique within the UserProfile database. Result of query is found in 'status'.

ListUsers: PROCEDURE [
    hint: UserProfile.UserName ← NIL, useHint: BOOLEAN ← FALSE,
    startAt: CARDINAL ← 0,
    numRequested: CARDINAL,
    direction: UserProfile.ListingDirection,
    z: UNCOUNTED ZONE]
    RETURNS [status: StatusCode, userList: UserList];

ListUsers returns a sequence of UserRecords out of the UserProfile database. The procedure will start listing users in one of the following ways depending on the value of 'useHint'. If 'useHint' = FALSE then the first listing algorithm will be followed. The listing algorithms are:
        (1) Starting at 'startAt', return 'numRequested' elements going 'direction'.
        (2) Starting at 'hint', return 'numRequested' elements going 'direction'.
    In order to index the database, element 1 is array index '0' while the last element in the database is indexed as 'sizeDBase' - 1. If status = 'ok' or 'shortList', a UserList of UserRecords has been allocated from 'z' and can be referenced in the range [0..userList.numUsers). Clients are required to call UPSecAdmin.FreeUserList to free the contents of 'userList'.

Fine Point -> If the implementation is unable to return a list containing 'numRequested' elements, the number that it could find will be returned with status ← 'shortList'. If 'numRequested' = 0 then 'userList' ← NIL and 'status' ← 'shortList'.

SizeDBase: PROCEDURE []
    RETURNS [status: StatusCode, numUsers: CARDINAL];

If 'status' = ok, the number of entries currently in the UserProfile database is returned via 'numUsers'.

ViewProfile: PROCEDURE [name: UserProfile.UserName, z: UNCOUNTED ZONE]
    RETURNS [status: StatusCode, profile: UserProfile.SecAdminViewHandle];

If 'status' = ok, a copy of all Security Administrator Viewable Properties for 'name' is allocated out of 'z' and returned via 'profile'. Clients should call UPSecAdmin.FreeViewRecord to free the contents of 'profile'.

1.1.5 Memory Release Procedures

```
FreeViewRecord: PROCEDURE [
    ptr: LONG POINTER TO UserProfile.SecAdminViewHandle, z: UNCOUNTED ZONE];

Frees the SecAdminViewRecord returned by ViewProfile back into the zone 'z'. 'ptr'
    will be set to NIL upon completion.

FreeUserList: PROCEDURE [ptr: LONG POINTER TO UserList, z: UNCOUNTED ZONE];

Frees the UserList returned by ListUsers back into the zone 'z'. 'ptr' will be set
    to NIL upon completion.
```

1.2.0 UPOperAdmin

The UPOperAdmin interface defines the procedures that client software should use in order to coordinate administration of an operator's own entry within the UserProfile database.

Clients are required to have registered an operator with the system before making any calls to procedures defined within this interface. (through SessionBegEnd.Logon) If 'name' presented doesn't match the UserName registered as the current operator in SessionMgr module, the status, 'insufficientPriv' will be returned.

1.2.1 TYPE and Return Status Descriptions

```
StatusCode: TYPE = {
    ok,              -- call completed normally
    acctNotFound,    -- account specified isn't a valid account on the system
    acctInactive,    -- account is resident in the system but not valid for
                     -- billing purposes.

dBaseDisappeared, -- database backing file was trashed from disk without User Profile
                      -- software's knowledge:    (SWBug)

pwdNotRequired,   -- password is not required
    pwdReusedTooSoon, -- password string is being reused too soon
                      -- (i.e. password is still in the user's pwdHistoryRecord)
    pwdTooShort,      -- password string is too 'long'
    pwdTooLong,       -- password string doesn't meet site defined length insufficientPriv, -- The name supplied is not that of the current operator.
    nilString,        -- one of the LONG STRING's supplied is NIL:  (SWBug)

notYetLoaded,     -- UserProfile Database is not loaded;   (SWBug)

knownSoftwareBug  -- Known software error caught. StatusCode will be added into
                      -- the next release of software.
};
```

StatusCode defines all the possible status codes that can be returned as a result of making calls through procedures defined within the interface. Note: To find out which of the above can be returned by an individual procedure, clients should consult the comments contained within UPOperAdmin.mesa definition file.

```
ViewHandle: TYPE = UserProfile.SecAdminViewHandle;
```

1.2.2 Procedures

```
ChangeProperty: PROCEDURE [
    name: UserProfile.UserName, newSetting: UserProfile.OperModProp]
    RETURNS [status: StatusCode - ok];
```

The property specified within 'newSetting' variant arm is validated against AC Model Standards governing changes done to the UserProfile Database by an operator updating their own profile. If the property meets the standards, the call is then passed on to the UserProfile Database Manager where the 'newSetting' variant is changed in the profile entry for 'name'.

Restrictions enforced during the validation process are:

- Password: Must be different than current password; Must not be found in password history; Its length must range between the site-defined minimum to a 40 character maximum. It is recommended that clients force the new password to be consistently entered twice before calling this procedure in order to prevent operator lockout as a consequence of a typographical error.
- DefaultAccount: Must be an active account within the Billing And Accounting Database.

```
FreeViewRecord: PROCEDURE [ptr: LONG POINTER TO ViewHandle, z: UNCOUNTED ZONE];
```

Frees the ViewRecord returned by ViewProfile back into the zone 'z'.

```
ViewProfile: PROCEDURE [name: UserProfile.UserName, z: UNCOUNTED ZONE]
    RETURNS [status: StatusCode, profile: ViewHandle];
```

If 'status' = 'ok', a subset of information on current operator 'name' is allocated out of 'z' and returned via 'profile'. Currently this is everything that an operator with 'Security Administrator' privileges can see minus the UserID. Clients should call UPOperAdmin.FreeViewRecord to free the contents of the record.

2.0 Session Manager Module Public Procedure Descriptions

2.1.0 SessionBegEnd

The SessionBegEnd interface is the means by which the Session Manager module is notified of an individual's intent to start a new session [i.e. 'Logon'] or complete a session in progress [i.e. 'Logoff']. In the overall Access Control context, it is in this manner that an operator authenticates themselves with the machine. The outcome of an operator's authentication attempt is a consequence of the Session Manager's validation of the credentials presented against those represented in the corresponding predefined profile record, which is held by the User Profile Manager.

This interface also provides the means by which the Session Manager is notified that the machine in which it is executing is prepared to service operator requests. The 'StartSessionMgt' procedure must be invoked [only once] at the point in time during system startup at which the initial operator session may begin. In fact, a side effect of this operation is to start a "Default Operator" session in the event that the Security Defaults reflect this as a preference of the site's Security Administrator.

"Default Operator" mode is controlled by the 'enableWalkupMode' Security Defaults parameter. When this parameter has been established as TRUE, the Session Manager will automatically establish the "Default Operator" as having a session in progress when no other operator has explicitly logged-on. The timeframes in which this may occur are between 'StartSessionMgt' and the initial 'Logon' and after any 'Logoff' but before the first subsequent 'Logon'. This mode is intended to satisfy the needs of those sites in which many users will operate the machine with indiscriminate feature capabilities and accountability. The reserved "Default User" profile record held by the User Profile Manager defines the Security Administrator's preference for the level of system capabilities to be availed operators through this mode of use.

The Security Administrator may alternately require all operators to explicitly authenticate themselves with the system [through 'Logon'] by establishing a FALSE value for the 'enableWalkupMode' Security Defaults parameter. This provides an increased level of system security as a consequence of individual accountability at the price of the inconvenience of requiring operator authentication upon commencing every instance of use.

In any instance in which one of these procedure calls results in a new operator session being initiated, the client is provided a copy of the corresponding operator's privileges as held by the User Profile Manager module. The expectation is that the indicated restrictions will be enforced by the client. For instance, only under the condition that the 'adminPrivilege' attribute implies Security Administrator privilege is the operator to be given access to the dialogs by which those functions are managed. [Given the sensitivity of the Security Administrator operations, the Access Control component modules protect themselves against abuse of this rule at the public interfaces.]

It is incumbent upon the client to release the space associated with this copy of the operator's privileges when it is no longer of value. It would seem that an appropriate time to invoke 'FreeProperties' for this purpose is at the conclusion of an operator's session. Thus, calls to 'Logoff' [or 'Logon', in the event that it is being used to implicitly perform a 'Logoff'] will frequently follow the release of the previous operator's privilege record.

2.1.1 Type Definitions

LogoffSource: TYPE = {operator, idleUITimeout};

Indicates whether the 'Logoff' is being requested as a consequence of operator request or the system [based on detectionof the operator's failure to initiate any new activity at the UI within the Security Administrator's preset interval (as reflected in the 'sessionTimeoutLen' Security Default parameter)].

OperatorCredentials: TYPE = RECORD [
    userID: UserProfile.UserID, password: UserProfile.Password];

The user profile properties by which an operator's identity is authenticated.

PreLogonMode: TYPE = {defaultUse, awaitingLogon};

Indicates whether the system is in a mode whereby 'defaultUse' is enabled or that explicit logon is required prior to continued operation. If the former, the additional return values represent significant information about the "Default User" environment.

2.1.2 Return Status Descriptions

```
LogoffStatus: TYPE = {
    acConfigMgrNotReady,  -- ConfigMgr is not ready; SW BUG
    inDefaultUseMode,     -- Currently operating as default user;
                          -- additional return values are invalid
    success,              -- Session terminated as requested;
                          -- 'newMode' entered; event logged
    notYetStarted,        -- SessionMgr has not yet been started; (SW BUG)
    upMgrNotReady,        -- UserProfileMgr is not ready; (SW BUG)
    wasNotLoggedOn        -- No session was in effect; additional return values reflect
                          -- the new state
};
```

Specifies the inclusive set of potential 'Logoff' operation completion status values.

```
LogonStatus: TYPE = {
    acConfigMgrNotReady,  -- ConfigMgr is not ready; SW BUG
    expiredPwd,           -- Same password has been used for length of time exceeding maximum
                          -- allowable interval [as defined by Security Default
                          -- 'pwdExpirationLen']
    inactiveUser,         -- Operator may not use the machine until
                          -- reactivated by the SecAdm
    invalidCredentials,   -- Credentials presented do not match
                          -- those of a valid user
    pwdReqdSet,           -- This is the operator's first logon since the Security Administrator
                          -- has required a password as part of their credentials
    pwdSetByAdm,          -- This is the operator's first logon since the Security Administrator
                          -- has established a new password for them.
    pwdTooShort,          -- This is the operator's first logon since the Security Administrator
                          -- has extended the minimum password length [Security Default
                          -- 'minPwdLen'] above that employed by this operator.
    notYetStarted,        -- SessionMgr has not yet been started; (SW BUG)
    success,              -- New session initiated without a hitch
    tooManyPwdMisses,     -- The maximum allowable cumulative number of incorrect
                          -- specifications of a single password has been exceeded
                          -- [Security Default 'pwdMissThreshold']
                          -- through prior unsuccessful 'Logon' attempts
    upMgrNotReady         -- UserProfileMgr is not ready; (SW BUG)
};
```

Specifies the inclusive set of potential 'Logon' operation completion status values.

A number of the status values above share the characteristic that valid credentials have been presented, a session has been initiated, yet the password must be changed by the operator immediately. It is expected that the client will enforce this rule. The status values referred to are: 'expiredPwd', 'pwdReqdSet', 'pwdSetByAdm', 'pwdTooShort', and 'tooManyPwdMisses'.

```
StartupStatus: TYPE = {
    acConfigMgrNotReady,  -- ACConfigMgr is not ready; (SW BUG)
    success,              -- The Session Manager has been placed in the indicated 'preLogonMode'
    upMgrNotReady,        -- UserProfileMgr is not ready; SW BUG
    wasStartedEarlier     -- The Session Manager has previously completed its startup
                          -- operation successfully
};
```

Specifies the inclusive set of potential 'StartSessionMgt' operation completion status values.

2.1.3 Operations Startup Procedures

The facilities of this section provide the means by which the Session Manager is prepared for operations at System Startup. The Session Manager is to be started only AFTER both the User Profile and Security Defaults Configuration Managers. It it also expected to be the case that the client will start the Session Manager when all other system facilities are actually ready to service operator activites, although this is beyond the scope of this module's requirements.

StartSessionMgt: PROCEDURE [z: UNCOUNTED ZONE]

RETURNS [
status: StartupStatus, newMode: PreLogonMode,
properties: UserProfile.SecAdminViewHandle];

This procedure signals the Session Manager to prepare itself to support operator sessions. In particular, it enters the 'newMode' indicated. The associated 'properties' apply only in the event of 'defaultUse' mode, in which case the space is allocated from the client-provided zone, 'z'. It is thus the client's responsibility to release it through a call to 'FreeProperties'.

2.1.4 Session Initiation and Termination Procedures

The following procedures represent the means by which operator sessions are bounded. That is, 'Logon' specifies the identity of the operator to whom machine capabilities [as exported by the User Interface] will be devoted during the interval preceding the next 'Logoff'.

Logoff: PROCEDURE [source: LogoffSource, z: UNCOUNTED ZONE]
    RETURNS [
        status: LogoffStatus, newMode: PreLogonMode,
        properties: UserProfile.SecAdminViewHandle];

Terminate the current operator's session at the initiation of the identified 'source'. The new machine state is reflected in the returned 'newMode' indicator, with the associated 'properties' applying in the event of 'defaultUse' mode. The associated space is allocated from the client-provided zone, 'z'. It is thus the client's responsibility to release it through a call to 'FreeProperties'.

'Logoff' places the system in one of two states, according to the Security Administrator's pre-selection through the Security Default 'enableWalkupMode' parameter. If TRUE, the system will be placed in a mode by which the privileges of the "Default User" are made available to any operator who elects to forego Logon. Otherwise, no system capabilities will be available pending presentation of valid credentials to the 'Logon' dialog.

'Logoff' is also employed to return the Session Manager to 'PreLogonMode' after a series of unsuccessful 'Logon' attempts. This is a consequence of the design decision to allow the client to enforce rules pertaining to authentication retry and timeout at 'Logon'. Given these goals, it is preferable for the Session Manager to enter 'PreLogonMode' only upon client demand. 'Logoff' thus serves as this delimiter consistent with the semantics: "Terminate the current session, if there is one. Enter 'PreLogonMode' irregardless".

Each 'Logoff' attempt shall be audited.

```
Logon: PROCEDURE [credentials: OperatorCredentials, z: UNCOUNTED ZONE]
    RETURNS [
        status: LogonStatus,
        properties: UserProfile.SecAdminViewHandle];
```

Validate the 'credentials' provided, recording the identified user as the current operator. Assuming sufficient authorization, those profile 'properties' which the operator is cleared to inspect are reported.

Valid 'credentials' may consist of a 'userID' alone or in combination with a 'password' according to site preference. This may vary between individuals within a site as controlled by the 'pwdRequired' field of the associated user profile record. The 'pwdUserSet' Security Default provides operator-independent control of this policy. Credentials are considered invalid in the event that a password is provided when unrequired.

If a session is in effect at the time of this call, it is first terminated. Invalid credentials will result in entrance to 'awaitingLogon' mode.

Assumption is that the client will maintain the current values of the modifiable session parameters subsequent to completion of this call.

Each 'Logon' attempt shall be audited.

2.1.5 Memory Release Procedures

The following procedure provides the means by which the dynamic memory allocated through other procedures of this interface is released.

```
FreeProperties: PROCEDURE [
    properties: LONG POINTER TO UserProfile.SecAdminViewHandle,
    z: UNCOUNTED ZONE];
```

Release the space associated with the specified user profile 'properties' handle in zone, 'z'. 'properties' is set to NIL upon procedure completion.

2.2.0 SessionQuery

This interfaces defines the PUBLIC procedures by which properties of the current operator may be obtained from the Session Manager. With the exception of the Operator Name [which remains current], these attributes come from the operator's user profile entry as of the time of session initiation (i.e. 'Logon' or entry into "Default User" mode). Subsequent session or profile level updates are NOT reflected in these values. The Dialogs and Access Control User Profile Manager maintain the latest information in these respective areas per the current design.

2.2.1 Return Status Definitions

```
StatusCode: TYPE = {
    noCurrentOperator,   -- Currently 'awaitingLogon'; nothing to report.
    notYetStarted,       -- SessionMgr has not yet been started; (SW BUG)
    success              -- Attributes for the current operator are provided.
};
```

Specifies the inclusive set of potential operation completion status values.

2.2.2 Current Operator Property Reporting Procedures

The following procedures represent the means by which the current operator's properties may be obtained.

GetOperatorsUserName: PROCEDURE [z: UNCOUNTED ZONE]
 RETURNS [status: StatusCode, name: UserProfile.UserName];

Report the identity of the current operator. The name is allocated from the client's zone, 'z'. It must be subsequently freed by invoking 'FreeOperatorsUserName'. 'name' is meaningless unless 'status' indicates 'success'.

IsOperatorACSR: PROCEDURE []
 RETURNS [status: StatusCode, csr: BOOLEAN];

Report TRUE if the current operator is a Xerox Customer Service Representative, else FALSE. 'csr' is meaningless unless 'status' indicates 'success'.

IsOperatorASecAdm: PROCEDURE []
 RETURNS [status: StatusCode, secAdm: BOOLEAN];

Report TRUE if the current operator is a Security Administrator, else FALSE. 'secAdm' is meaningless unless 'status' indicates 'success'.

IsOperatorASiteAdm: PROCEDURE []
 RETURNS [status: StatusCode, siteAdm: BOOLEAN];

Report TRUE if the current operator is a Site Administrator, else FALSE. 'siteAdm' is meaningless unless 'status' indicates 'success'.

2.2.3 Memory Release Procedures

The following procedure provides the means by which the dynamic memory allocated through other procedures of this interface is released.

FreeOperatorsUserName: PROCEDURE [
 namePtr: LONG POINTER TO UserProfile.UserName, z: UNCOUNTED ZONE];

Release the space in zone 'z' associated with the 'name' acquired from 'GetOperatorsUserName'. 'namePtr' is set to NIL upon procedure completion.

3.0 Configuration Manager Module Public Procedure Descriptions

3.1.0 ACConfigSecAdm

This section describes the PUBLIC interface by which the Trillium Emulator ("TEM") interacts with the Access Control Configuration Manager ("ACConfigMgr") in support of "Security Administration" Dialogs. In particular, these procedures provide the means by which the TEM supports dialog operations on the Security Defaults parameters. These parameters are managed solely by the ACConfigMgr. Procedures are provided by which the value of parameters may be inspected. Only a single parameter value may be modified per procedure call.

As background information, the Security Defaults control the site-specifiable operator-independent security policy/rules. Only those "trusted" operator(s) known as "Security Administrators" may inspect or modify these values at the user level. Operators are designated as having "Security Administrator" privilege through User Profile operations. Such an operator is charged with ensuring machine usage consistent with site security rules. "Trusted" software clients of the ACConfigMgr are allowed to inspect these values consistent with their security policy enforcement responsibilities.

3.1.1 Parameter Reporting Procedures

The procedures described in this section provide the client with the means of inspecting the current value of the Security Default parameters as a set or individually.

```
ReportAllParms: PROCEDURE [
    parmsPtr: LONG POINTER TO ACConfigTypes.AllParms]
    RETURNS [status: ACConfigTypes.StatusCode];
```

The complete set of configuration parameter values is reported to the client at the location indicated by 'parmsPtr'. 'status' may assume any of the following values: 'insufficientPriv', 'notYetLoaded', 'success'.

```
ReportSingleParm: PROCEDURE [
    parmPtr: LONG POINTER TO ACConfigTypes.SingleParm]
    RETURNS [status: ACConfigTypes.StatusCode];
```

The value associated with the configuration parameter indicated by the variant at 'parmPtr' is reported to the client in the record provided. 'status' may assume any of the following values: 'insufficientPriv', 'notYetLoaded', 'success'.

3.1.2 Parameter Modification Procedures

The procedure described in this section provides the client with the means of modifying the current value of any Security Default parameter individually.

```
ModifyParm: PROCEDURE [parm: ACConfigTypes.SingleParm]
    RETURNS [status: ACConfigTypes.StatusCode];
```

The value associated with the configuration parameter indicated by the variant, 'parm', is replaced with that specified. 'status' may assume any of the following values: 'insufficientPriv', 'notYetLoaded', 'outOfRange', 'segmentError', 'stretchUserIDs', 'success'.

A.0    UserProfile Interface

```
<<******************************************************************
 *   FUNCTION: Defines all TYPES & CONSTANTS that are common across  *
 *      the entire UserProfile Module.                               *
 ******************************************************************>>

DIRECTORY
   AccountMgrCommon USING [AccountNumber],
   System USING [GreenwichMeanTime];

UserProfile: DEFINITIONS =

BEGIN << UserProfile >>

-- CONSTANTS minPwdLen: CARDINAL = 3;         -- Minimum Password Length
   maxPwdLen: CARDINAL = 40;        -- Maximum Password Length minUserIDLen: CARDINAL = 1;      -- Minimum UserID Length
   maxUserIDLen: CARDINAL = 11;     -- Maximum UserID Length minUserNameLen: CARDINAL = 1;    -- Minimum UserName Length
   maxUserNameLen: CARDINAL = 40;   -- Maximum UserName Length maxUsersSupported: CARDINAL = 100;  -- Maximum number of users that the
                                       -- User Profile Database will support.

-- TYPES

AdminPrivilege: TYPE = {
      both,      -- Operator has both 'Security' and 'Site' admin abilities
      security,  -- Operator has 'Security' admin abilities
      site,      -- Operator has 'Site' admin abilities
      none       -- Operator has 'no' admin privileges
      };

JobAccessLevel: TYPE = {
      owner,  -- Only the operator identified as the 'owner' has access to the job
      none,   -- 'No' operator, including the owner has access to the job
      all     -- 'Every' operator has access to the job
      };

DefaultJobAccess: TYPE = RECORD [
      aquire: JobAccessLevel,    -- Read access
      modify: JobAccessLevel];   -- Read/Write Access
      -- 'OperModProp' is a variant record with each arm
      -- representing a Normal Operator modifiable property.

OperModProp: TYPE = RECORD [
      property: SELECT tag: OperatorModifyProperty FROM
         password       => [password: Password],
         defaultAccount => [defaultAccount: AccountMgrCommon.AccountNumber],
         defaultJobACL  => [defaultJobACL: DefaultJobAccess]
         ENDCASE];

-- 'SecAdminModProp' is a variant record with each arm
      -- representing a Security Administrator modifiable property.
```

```
SecAdminModProp: TYPE = RECORD [
    property: SELECT tag: SecAdminModifyProperty FROM
        userID          => [userID: UserID],
        userName        => [userName: UserName],
        pwdRequired     => [pwdRequired: BOOLEAN],
        password        => [password: Password],
        defaultAccount  => [defaultAccount: AccountMgrCommon.AccountNumber],
        featurePrivilege => [featurePrivilege: FeaturePrivilege],
        adminPrivilege  => [adminPrivilege: AdminPrivilege],
        servicePrivilege => [servicePrivilege: ServicePrivilege],
        defaultJobACL   => [defaultJobACL: DefaultJobAccess],
        profileState    => [profileState: ProfileState],
    ENDCASE];

FeaturePrivilege: TYPE = {
    L1, --
    L2, --
    L3  --
    };

ListingDirection: TYPE = {
    forward,
    backward
    };

OperatorModifyHandle: TYPE = LONG POINTER TO OperatorModifyRecord = NIL;

-- Normal Operator Modify-able UserProfile Properties

OperatorModifyProperty: TYPE = {password, defaultAccount, defaultJobACL};

-- 'OperatorModifyRecord' contains fields for all the properties within a
    -- user's UserProfile Record for which the normal operator can 'MODIFY' the
    -- values.

OperatorModifyRecord: TYPE = RECORD [
    password        : Password,
    defaultAccount  : AccountMgrCommon.AccountNumber,
    defaultJobACL   : DefaultJobAccess];

Password: TYPE = LONG STRING;

ProfileState: TYPE = {
    active,   -- Operator is able to work on the system
    inactive  -- Operator locked out of the sytem by Security Administrator
    };

SecAdminModifyHandle: TYPE = LONG POINTER TO SecAdminModifyRecord = NIL;

-- Security Adminstrator Modify-able UserProfile Properties

SecAdminModifyProperty: TYPE = {userID, userName, pwdRequired, password,
    defaultAccount, featurePrivilege, adminPrivilege, servicePrivilege,
    defaultJobACL, profileState};

-- 'SecAdminModifyRecord' contains fields for all the properties within a user's
    -- UserProfile Record for which the Security Administrator can 'MODIFY' the values.
```

```
SecAdminModifyRecord: TYPE = RECORD [
    userID          : UserID,
    userName        : UserName,
    pwdRequired     : BOOLEAN,
    password        : Password,
    defaultAccount  : AccountMgrCommon.AccountNumber,
    featurePrivilege: FeaturePrivilege,
    adminPrivilege  : AdminPrivilege,
    servicePrivilege: ServicePrivilege,
    defaultJobACL   : DefaultJobAccess,
    profileState    : ProfileState];

SecAdminViewHandle: TYPE = LONG POINTER TO SecAdminViewRecord = NIL;

-- Security Adminstrator View-able UserProfile Properties

SecAdminViewProperty: TYPE = {userID, userName, pwdRequired, lastPwdChange,
    lastSession, defaultAccount, featurePrivilege, adminPrivilege,
    servicePrivilege, defaultJobACL, profileState, numFailedLogins};

-- 'SecAdminViewRecord' contains fields for all the properties within a
    -- user's UserProfile Record for which the Security Administrator can
    -- inspect the values of through the Security Admin dialogues.

SecAdminViewRecord: TYPE = RECORD [
    userID          : UserID,
    userName        : UserName,
    pwdRequired     : BOOLEAN,
    lastPwdChange   : System.GreenwichMeanTime,
    lastSession     : Session,
    defaultAccount  : AccountMgrCommon.AccountNumber,
    featurePrivilege: FeaturePrivilege,
    adminPrivilege  : AdminPrivilege,
    servicePrivilege: ServicePrivilege,
    defaultJobACL   : DefaultJobAccess,
    profileState    : ProfileState,
    numFailedLogins : CARDINAL];

ServicePrivilege: TYPE = {
    OCM,  -- Optional Customer Maintainance
    ACM,  -- Advanced Customer Maintainance
    CSR,  -- Xerox Customer Service Representative
    none  -- Operator has 'no' service privileges
    };

-- A Session is defined as the time between Operator login and
    -- Operator logout Session: TYPE = RECORD [
    login : System.GreenwichMeanTime,
    logout: System.GreenwichMeanTime];

UserID: TYPE = LONG STRING;

UserName: TYPE = LONG STRING;

UserPnm: TYPE [1];

-- 'ViewSecAdminProp' is a variant record with each arm
    -- representing a Security Administrator viewable property.
```

```
ViewSecAdminProp: TYPE = RECORD [
    property: SELECT tag: SecAdminViewProperty FROM
        userID          => [userID: UserID],
        userName        => [userName: UserName],
        pwdRequired     => [pwdRequired: BOOLEAN],
        lastPwdChange   => [lastPwdChange: System.GreenwichMeanTime],
        lastSession     => [lastSession: Session],
        defaultAccount  => [defaultAccount: AccountMgrCommon.AccountNumber],
        featurePrivilege => [featurePrivilege: FeaturePrivilege],
        adminPrivilege  => [adminPrivilege: AdminPrivilege],
        servicePrivilege => [servicePrivilege: ServicePrivilege],
        defaultJobACL   => [defaultJobACL: DefaultJobAccess],
        profileState    => [profileState: ProfileState],
        numFailedLogins => [numFailedLogins: CARDINAL],
    ENDCASE];

END. << UserProfile >>

A.1    UPDefAccount Interface

<<****************************************************************
     *  FUNCTION: Provides PUBLIC Interface between the Accounting    *
     *      software and the UserProfile database for operations on the *
     *      User's Default Account.                                   *
     ****************************************************************>>

DIRECTORY
    AccountMgrCommon USING [AccountNumber];

UPDefAccount: DEFINITIONS =

BEGIN << UPDefAccount >>

-- TYPES

StatusCode: TYPE = {
        nilString,      -- one of the strings had a NIL value
        notYetLoaded,   -- the UserProfile database has not been loaded yet
        ok};            -- call completed normally

-- PROCEDURES

RenameAccount: PROCEDURE [
        oldAccount: AccountMgrCommon.AccountNumber,
        newAccount: AccountMgrCommon.AccountNumber]
        RETURNS [status: StatusCode];

-- This procedure iterates the whole UserProfile database replacing any
        -- user.defaultAccount = 'oldAccount' with one equal to 'newAccount'.

END. << UPDefAccount >>
```

A.2    ACConfigTypes Interface

<< This interface defines the PUBLIC TYPEs associated with the
   Access Control Configuration Manager ("ACConfigMgr"). These
   symbols define the data types of the Security Defaults
   parameters. A number of symbols have been included in this file
   to define the data types of arguments and return values for client
   entry points into the Access Control Configuration Manager.

As background information, the Security Defaults control the
   site-specifiable operator-independent security policy/rules. Only
   those "trusted" operator known as Security Administrators may
   inspect or modify these values at the user level. Operators are
   designated as having "Security Administrator" privilege through User
   Profile operations. Such an operator is charged with ensuring machine
   usage consistent with site security rules. "Trusted" software
   clients of the ACConfigMgr are allowed to inspect these values
   consistent with their security policy enforcement responsibilities. >>

DIRECTORY
    UserProfile USING [maxPwdLen, maxUserIDLen, minPwdLen, minUserIDLen];

ACConfigTypes: DEFINITIONS =
    { << ACConfigTypes >>

<< CONSTANTS >>
    disablePwdExpiration: CARDINAL = 0;
    maxPwdExpirationLen: CARDINAL = 365;   -- 1 year disablePwdHistory: CARDINAL = 0;
    maxPwdHistoryLen: CARDINAL = 2;   -- per the Admin & Security Defaults FDs disablePwdMissThreshold: CARDINAL = 0;
    maxPwdMissThreshold: CARDINAL = 1000;-- per SOD FDs disableSessionTimeout: CARDINAL = 0;
    maxSessionTimeoutLen: CARDINAL = 60 * 8;   -- 8 hours << TYPES >>
    AllParms: TYPE = RECORD [
      enableWalkupMode: EnableWalkupMode,
      minPwdLen: MinPwdLen,
      minUserIDLen: MinUserIDLen,
      pwdExpirationLen: PwdExpirationLen,
      pwdHistoryLen: PwdHistoryLen,
      pwdMissThreshold: PwdMissThreshold,
      pwdUserSet: PwdUserSet,
      sessionTimeoutLen: SessionTimeoutLen];
    << This record provides the means by which the complete set of
       configuration parameter values may be exchanged between the
       client and the AC Configuration Manager. >>

EnableWalkupMode: TYPE = BOOLEAN;
    << This flag indicates the site's preference to allow system operation
       without first requiring the operator to supply a valid identity.
       If TRUE, the system will enable such usage at system startup and
       whenever no operator is logged-on. >>

```
MinPwdLen: TYPE = [UserProfile.minPwdLen..UserProfile.maxPwdLen];
<< The minimum number of characters which may comprise any operator's
   current password. >>

MinUserIDLen: TYPE = [UserProfile.minUserIDLen..UserProfile.maxUserIDLen];
<< The minimum number of characters which may comprise any operatpr's
   current UserID. >>

Parameter: TYPE = (
   enableWalkupMode, minPwdLen, minUserIDLen, pwdExpirationLen,
      pwdHistoryLen, pwdMissThreshold, pwdUserSet, sessionTimeoutLen};
<< Identifies the single parameter in which the client is
   interested. >>

PwdExpirationLen: TYPE = [disablePwdExpiration..maxPwdExpirationLen];
<< The number of DAYS in which the operator is allowed to employ the
   same password. Upon expiration of this interval, the system will
   force the operator to supply a new password for subsequent
   activity. A value of 0 (ZERO) disables this control. >>

PwdHistoryLen: TYPE = [disablePwdHistory..maxPwdHistoryLen];
<< The number of previously-used passwords to be maintained against
   each operator. The system will not allow an operator to reuse any
   password within this bound. A value of 0 (ZERO) disables this
   control. >>

PwdMissThreshold: TYPE = [disablePwdMissThreshold..maxPwdMissThreshold];
<< The number of instances an operator is allowed to incorrectly
   specify their CURRENT password before the system forces them to
   provide a new one for subsequent activity. A value of 0 (ZERO)
   disables this control. >>

PwdUserSet: TYPE = {
    all,       -- every operator MUST have a password
    mixed,     -- any operator MAY have a password depending
               -- upon the setting in their profile record
    privilegedOnly};  -- only privileged operators may have a
                      -- password. privileged operators are those
                      -- with any-Admin or CSR-Service capability.
<< Defines the set of operators employing the password as an increment
   to the UserID for system identification. >>

SessionTimeoutLen: TYPE = [disableSessionTimeout..maxSessionTimeoutLen];
<< The number of MINUTES in which no operator interaction is initiated
   at the UI after which the system will automatically terminate the
   current session. A value of 0 (ZERO) disables this control. >>

SingleParm: TYPE = RECORD [
    name: SELECT_tag: Parameter FROM
        enableWalkupMode => [enableWalkupMode: EnableWalkupMode],
        minPwdLen => [minPwdLen: MinPwdLen],
        minUserIDLen => [minUserIDLen: MinUserIDLen],
        pwdExpirationLen => [pwdExpirationLen: PwdExpirationLen],
        pwdHistoryLen => [pwdHistoryLen: PwdHistoryLen],
        pwdMissThreshold => [pwdMissThreshold: PwdMissThreshold],
        pwdUserSet => [pwdUserSet: PwdUserSet],
        sessionTimeoutLen => [sessionTimeoutLen: SessionTimeoutLen],
        ENDCASE];
  << This record provides the means by which a single configuration
     parameter value may be exchanged between the client and the AC
     Configuration Manager. >>
```

```
<< Status Codes >>
StatusCode: TYPE = {
    alreadyExists,     -- CREATE ignored as backing file created previously
    alreadyLoaded,     -- LOAD ignored as it has been successfully performed
                       -- previously
    directoryError,    -- directory operation failed {temporary catchall}
    doesNotExist,      -- backing file does not exist as yet
    fileError,         -- access to backing file failed {temporary catchall}
    fullUPDBase,       -- User Profile backing store lacks sufficient room
    insufficientPriv,  -- current operator is not a SecAdm
    notYetLoaded,      -- operation cannot be serviced until configuration is
                       -- loaded
    outOfRange,        -- replacement value does not conform to parameter's
                       -- acceptable range
    segmentError,      -- segment administration operation failed {temporary catchall}
    stretchUserIDs,    -- must lengthen existing UserIDs to reset minimum
    success,           -- operation completed as expected
    upMgrNotReady};    -- UserProfileMgr is not ready; SW BUG: major exception }. << ACConfigTypes >>

A.3    ACConfigDefaults Interface

<< This interface is PUBLIC from the Access Control Configuration Manager
   ("ACConfigMgr"). It defines the DEFAULT values with which the "Security
   Defaults" parameters are installed on system distribution [and subsequent
   'RESTORE DEFAULTS' operations?]. These represent our educated guess as to
   the values which will satisfy the requirements of the majority of our
   customers. As such, the values combine to form a middle-of-the-road
   security solution: not exceedingly severe, but sufficiently visible to
   maintain operator awareness.

As background information, the "Security Defaults" control the
   site-specifiable operator-independent security policy/rules. Only
   those "trusted" operator(s) known as "Security Administrators" may
   inspect or modify these values at the user level. Operators are
   designated as having "Security Administrator" privilege through User
   Profile operations. Such an operator is charged with ensuring machine
   usage consistent with site security rules. "Trusted" software
   clients of the ACConfigMgr are allowed to inspect these values
   consistent with their security policy enforcement responsibilities. >>

DIRECTORY
    ACConfigTypes USING [AllParms];

ACConfigDefaults: DEFINITIONS =
    { << ACConfigDefaults >> parmValues: ACConfigTypes.AllParms = [
        enableWalkupMode: FALSE,
        minPwdLen: 6,
        minUserIDLen: 3,
        pwdExpirationLen: 182,
        pwdHistoryLen: 2,
        pwdMissThreshold: 500,
        pwdUserSet: all,
        sessionTimeoutLen: 60];

}. << ACConfigDefaults >>
```

We claim:

1. Site security process for an electronic printing system, said printing system including a reprographic printer for making prints and a user interface including a display screen for programming said printer to make prints, comprising the steps of:
   a) providing a security administrator for said printing system;
   b) providing a security profile with discrete security levels for different classes of users of said printing system under the control of said security administrator;
   c) giving said administrator power to
      1) assign user identification numbers at less secured ones of said sites, and
      2) enable use of passwords by said users at more secure ones of said sites;
   d) providing a site administrator;
   e) giving said site administrator control over user job programming options for said printing system site;
   f) isolating functions of said site administrator from user functions by assigning special identification number and password to said site administrator to prevent users of said printing system from accessing said site administrator functions; and
   g) providing user file security by enabling users of said printing system,
      1) to protect user files by user passwords,
      2) to limit access of others to user files, and
      3) to assign a non-removable security label to a user's files
   which prevents printing of said files by said printer or displaying of said files on said screen without said security label.

2. The process according to claim 1 including the step of:
   providing user file security by limiting user access to said printing system programming features.

3. The process according to claim 1 including the step of:
   providing user file security by restricting user access to printer programming features that allow only moving or changing of files.

4. The process according to claim 1 including the step of:
   enabling said site administrator to restrict access to complex printer programming features to avoid printer downtime.

5. The process according to claim 1 including the step of:
   enabling said site administrator to restrict user access to pre-selected printer programming features to reduce personal use of said printing system.

6. Security process for an electronic reprographic printer, comprising the steps of:
   (a) for site security,
      (1) providing a security profile with discrete security levels for different classes of users under the control of a security administrator,
      (2) giving said administrator power to assign user identification numbers at less secured sites, and
      (3) enabling use of passwords by said users at more secure sites;
   (b) for site administrator security, isolating administrator functions from user functions by assigning a special identification number and password to said site administrator to prevent users from accessing administrator functions; and
   (c) for file security enabling users,
      (1) to protect user files by user passwords,
      (2) to limit access of others to user files,
      (3) to assign a non-removable security label to a user's files with printing of a file prevented unless the security label is printed therewith.

7. In an electronic printing system having programming means enabling users to program instructions for print jobs; a source of image signals; memory means for storing said print jobs together with said image signals; and a printer for producing prints from said image signals in accordance with said instructions, the combination of:
   a) system lockout means for controlling programming of print jobs on said system, said lockout means being responsive to input of a preset user identification number and user name to permit said users to program instructions for said users' print jobs;
   b) first means to limit the source of said identification number to a preset identification number source for said system, said first means enabling said source to assign special identification numbers to said users enabling said users to program instructions for said users' print jobs on said system;
   c) second means to allow at least some of said users to provide personal user passwords to limit access of other users to said user' print jobs in said memory means; and
   d) third means to allow said users to limit the ability of other users having access to said users' print jobs to change said users' print jobs following access.

8. In combination;
   a) an electronic printer having an internal security data base for storing security data including user passwords;
   b) an external authorization data base for storing user profiles including special user identification numbers;
   c) means qualifying at least one security administrator for assigning preset identification numbers to individual users or groups of users required to allow said users to access said system with at least some of said users enabled to use individual passwords;
   d) said passwords being stored in said internal data base;
   e) means enabling said users to impose selected restrictions on the right of other users to alter a user's job files;
   f) a communication channel coupling said external authorization data base to said printer whereby, to access said printer, a user is required to input his identification number and password;
   g) means for checking the identification number input by a user against the identification number in said external authorization data base to establish if said identification number input by said user is valid;
   h) means for checking the user password input by said user against the passwords in said internal data base to establish if said password input by said user is valid; and
   i) means responsive to input of a valid identification number and valid password to enable said user access to said printer.

* * * * *